(12) United States Patent
Nagata

(10) Patent No.: US 6,396,835 B1
(45) Date of Patent: May 28, 2002

(54) METHOD AND APPARATUS FOR DISPLAYING TRANSMISSION ROUTE FOR USE IN A SWITCHED NETWORK AND METHOD OF DETECTING A FAILURE USING SUCH A METHOD AND APPARATUS

(75) Inventor: Tsuyoshi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/115,953

(22) Filed: Jul. 15, 1998

(30) Foreign Application Priority Data

Feb. 19, 1998 (JP) ............................................. 10-037717

(51) Int. Cl.[7] .......................... H04L 12/54; H04L 12/56
(52) U.S. Cl. ......................................... 370/395; 370/410
(58) Field of Search ................................. 370/216, 242, 370/241, 244, 247, 248, 250, 395, 397, 351, 399, 235, 410; 359/110; 345/1.5, 5, 22; 340/3.42, 3.43

(56) References Cited

U.S. PATENT DOCUMENTS

| 5,539,559 A | * | 7/1996 | Cisneros et al. | ............ 359/117 |
| 5,557,300 A | * | 9/1996 | Satoh | ......................... 345/170 |
| 5,557,317 A | * | 9/1996 | Nishio et al. | .................. 348/7 |
| 5,673,264 A | * | 9/1997 | Hamaguchi | ................. 370/397 |
| 6,181,680 B1 | * | 1/2001 | Nagata et al. | .............. 370/248 |

FOREIGN PATENT DOCUMENTS

| JP | 61-23259 | 1/1986 |
| JP | 63-211953 | 9/1988 |
| JP | 7-7542 | 1/1995 |

* cited by examiner

*Primary Examiner*—Hassan Kizou
*Assistant Examiner*—Duc Ho
(74) *Attorney, Agent, or Firm*—Katten Muchin Zanis Rosenman

(57) ABSTRACT

An ATM switch supplies an ATM terminal with a display command for causing a display apparatus provided in an ATM communication apparatus or an ATM transmission route to provide a display. The communication apparatuses and the ATM transmission route receiving the display command cause respective light-emitting bodies to emit light. Thus, the transmission route on which the display command is transmitted is visualized by illuminated display. The status of failure is readily determined based on the status of illuminated display.

20 Claims, 21 Drawing Sheets

METHOD AND APPARATUS FOR DISPLAYING TRANSMISSION ROUTE FOR USE IN A SWITCHED NETWORK AND METHOD OF DETECTING A FAILURE USING SUCH A METHOD AND APPARATUS

BACKGROUND OF THE INVENTION

1. Field of the Invention

The present invention generally relates to a method and apparatus for displaying a transmission route in a switched network and to a method of detecting a failure using such a method and apparatus.

More particularly, the present invention relates to a method and apparatus for displaying a transmission route in a ATM switched network formed by a fiber-optic cable, and a method of detecting a failure using such a method and apparatus.

2. Description of the Related Art

Asynchronous Transfer Mode (ATM) is known as a communication technology suitable for transmitting a large volume of data. In ATM, a fiber-optic cable is used to implement a communication channel (transmission channel).

Conventionally, a failure occurring on a route in an ATM switched network is performed by monitoring the number of ATM test cells generated by an ATM test cell generating apparatus and transmitted through an arbitrary communication apparatus and fiber-optic cable belonging to the ATM switched network. When it is found that the ATM test cells are not transmitted through the apparatus and cable at all, or when the volume of cells decreases as they are transmitted through the apparatus and cable, it is determined that a failure occurs.

In an ATM switched network, distribution of data is performed such that the hardware decodes destination information in an ATM header or an ATM tag in a tagged ATM cell to be transmitted. No error checking is performed for transferred bits. For this reason, a failure on a transmission route may not be found without examining the actual flow of ATM cells.

For example, even when the cable connection is seemingly proper, the ATM switched network may still have a failure. For example, the following problems may exist.

(1) Problem Due to a Bit Error Caused by Contamination of a Fiber-optic Cable

A bit error may be generated on a transmission route formed by a fiber-optic cable due to dust or the like. As mentioned above, such a bit error fails to be detected without causing ATM cells to flow in the transmission route. This means that detection of the bit error requires that communication apparatuses and fiber-optic cables be checked one by one while ATM cells are caused to flow in the network. For one-by-one checking of the communication apparatuses and fiber-optic cables, information relating to the arrangement of the communication apparatuses and fiber-optic cables on the transmission route and information relating to the connection of the fiber-optic cables should be available.

The information relating to the arrangement of the communication apparatuses and fiber-optic cables on the transmission route and information relating to the connection of the fiber-optic cables may be displayed in the form of graphical user interface (GUI) using data listing the arrangement of the apparatuses served by an ATM switch. While these information may be displayed as logical arrangement of the apparatuses or may indicate a detailed arrangement of the apparatuses served by the switch, it is difficult to accurately display the connection of cables between the apparatuses. For this reason, the experience of an operator may be relied upon for display of the arrangement and connection.

(2) Problem Relating to Improper Connection Due to Complex Connection

A plurality of ATM switches may be connected to form multiple stages in order to adapt for a large volume of traffic in a high-speed, advanced ATM switched network. In this arrangement, a large number of fiber-optic cables should be connected together. The communication capacity is proportional to the number of fiber-optic cables. However, when the number of fiber-optic cables is increased, an error in connecting cables or in replacing a failed cable is more likely to occur. An error in connecting cables brings about a failure in the switching performance of the ATM switched network. In order to resolve this, the arrangement of apparatuses and cable connection on a test route should be checked one by one. This involves a relatively large volume of work.

(3) Problem Relating to Input Error in Data Listing the Arrangement of Apparatuses Served by a Switch Even when the physical arrangement of apparatuses served by the switch and cable connection are proper, the data listing the arrangement of apparatuses served by the switch may be improperly input. When such an error occurs, the system may be operated on wrong data listing the arrangement of apparatuses so that it takes time to find a problem. As new apparatuses are added to the network, the data is updated. Therefore, there is always a chance that an input error occurs. In order to identify an input error, it is necessary to examine the physical arrangement of apparatuses and cable connection one by one for possible errors, based on a drawing showing the arrangement of apparatuses and based on the information relating to the test route.

SUMMARY OF THE INVENTION

Accordingly, an object of the present invention is to provide a method and apparatus for displaying a transmission route for use in a switched network and a method of detecting a failure using such a method and apparatus, in which the aforementioned problems are eliminated.

Another and more specific object of the present invention is to easily and speedily identify a failure on a transmission route between any communication terminals without requiring an excessively large number of processes and resorting to the experience of an operator.

In order to achieve the aforementioned objectives, the present invention provides a transmission route display method for use in a transmission system wherein a display apparatus that provides a display responsive to a display command is provided in at least one of communication apparatuses and transmission routes in a switched network, comprising the steps of: one of said communication apparatuses in said switched network transmitting the display command to one of another of said communication apparatuses and the transmission route; and the display apparatus of said another of said communication apparatuses or the transmission route that received said display command providing a display so that a data transmission route over which said display command is delivered is indicated by the display.

The aforementioned objects can also be achieved by a failure detecting method for detecting a failure in a switched network, for use in a transmission system wherein a display apparatus that provides a display responsive to a display command is provided in at least one of communication terminals and transmission routes in the switched network, comprising the steps of: one of said communication apparatuses in said switched network transmitting the display command to one of another of said communication apparatuses and the transmission route; the display apparatus of said another of said communication apparatuses or the transmission route that received said display command providing the display; and detecting a failure in said switched network by examining a status of display occurring between a first communication terminal and a second communication terminal.

The aforementioned objects can also be achieved by a transmission route display system comprising: a switched network comprising communication apparatuses and transmission routes; and a display apparatus provided in at least one of said communication apparatuses and said transmission routes, wherein one of said communication apparatuses transmits a display command for causing the display apparatus of one of the communication apparatus and the transmission route to provide a display, an information analyzing unit is provided in at least one of said communication apparatuses and said transmission routes, and said information analyzing unit causes, responsive to the display command received from said one of said communication apparatuses, the display apparatus of one of another of said communication apparatuses and the transmission route to provide the display, so that a data transmission route over which said display command is delivered is indicated by the display.

The aforementioned objects can also be achieved by a transmission route display apparatus provided in at least one of communication apparatuses and transmission routes in a switched network, wherein an information analyzing apparatus is provided in at least one of said communication apparatuses and said transmission routes, and said information analyzing apparatus causes, responsive to a display command received from one of said communication apparatuses, the display apparatus one of another of said communication apparatuses and the transmission route to provide a display, so that a data transmission route over which said display command is delivered is indicated by the display.

The aforementioned objects can also be achieved by a communication apparatus comprising: an information analyzing apparatus; a display apparatus, wherein said information analyzing apparatus causes, responsive to a display command received from another communication apparatus, the display apparatus to provide a display, so as to indicate that said display command is transmitted through said communication apparatus.

BRIEF DESCRIPTION OF THE DRAWINGS

Other objects and further objects will be apparent from the following detailed description when read in conjunction with the accompanying drawings, in which.

DETAILED DESCRIPTION OF THE PREFERRED EMBODIMENTS

Figure 2:
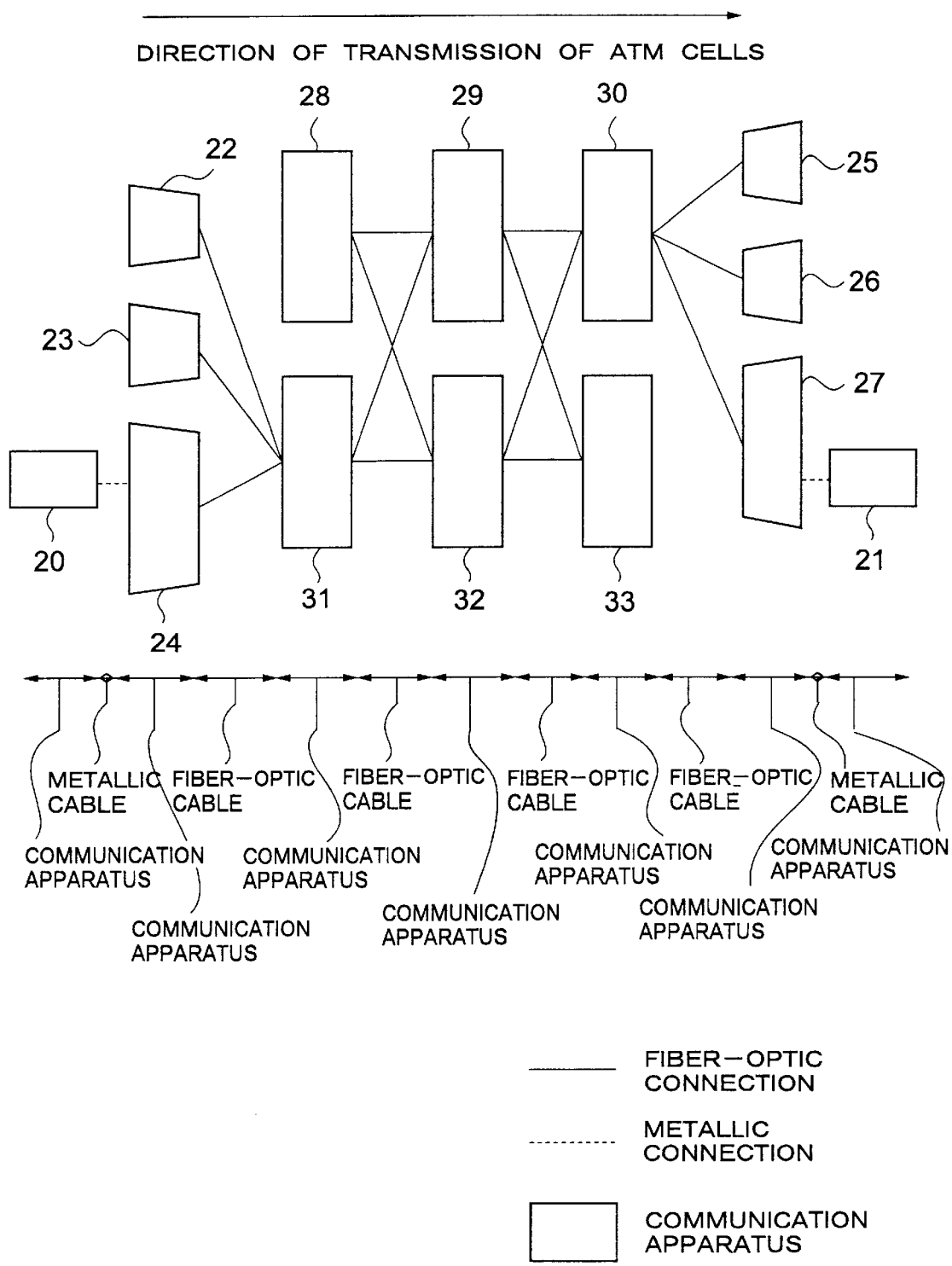
FIG. 2 shows a communication apparatus and how fiber-optic cables are connected.

FIG. 2 shows in a top half thereof an ATM switch assumed in the description that follows and also shows in a bottom half thereof how communication apparatuses of the top half and fiber-optic cables are connected. Self routing modules (SRM; to be described later) 28–33, multiplexing circuits 22–24, distributing circuits 25–27 and subscriber circuits 20 and 21 constitute an ATM switch. Fiber-optic cables connect the self routing modules 28–33 to each other, connect the multiplexing circuits 22–24 to the self routing modules 28–33 and connect the distributing circuits 25–27 to the self routing modules 28–33. The multiplexing circuits 22–24 are connected to the subscriber circuit 20 by a metallic transmission route. The distributing circuits 25–27 are connected to the subscriber circuit 21 by a metallic transmission route.

While self routing modules SRM, multiplexing circuits and distributing circuits are shown as communication apparatuses in FIG. 2, communication apparatuses generally include switches, self routing modules, subscriber circuits, communication terminals, branching and inserting circuits, multiplexing and distributing apparatuses, add drop multiplexers (ADM) and cross connectors.

Figure 1:
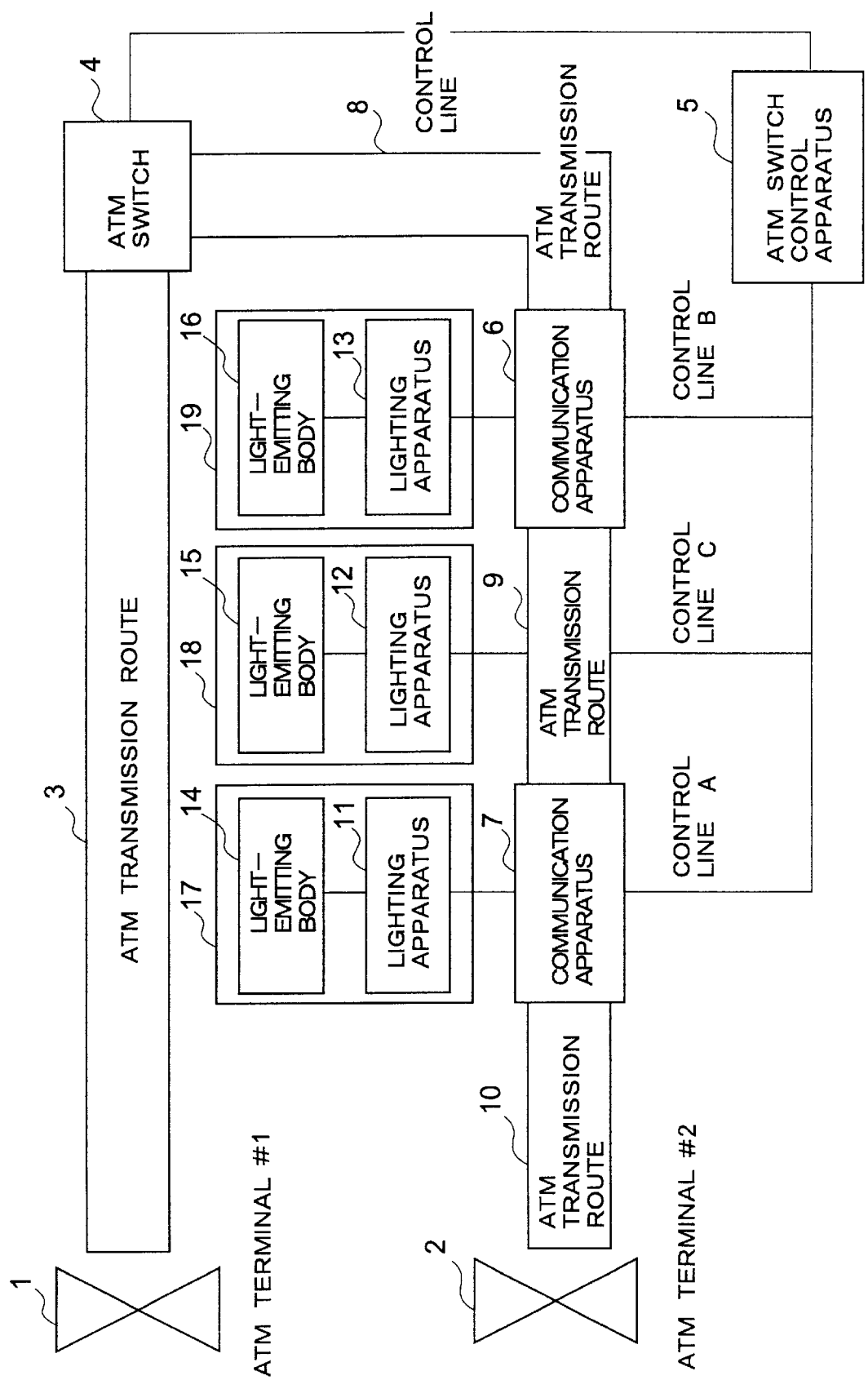
FIG. 1 shows a transmission route display method according to the present invention.

FIG. 1 is a schematic diagram showing a transmission route display method according to the present invention adapted for use in an ATM switched network that includes the switch of FIG. 2. An ATM terminal #1 communicates with an ATM terminal #2 via an ATM transmission route 3, an ATM switch 4, an ATM transmission route 8, a communication apparatus 6, an ATM transmission route 9, a communication apparatus 7 and an ATM transmission route 10. In FIG. 1, the communication apparatuses 6, the ATM transmission route 9 and the communication apparatus 7 are provided with a display capability which is activated depending on needs.

Referring to FIG. 1, a display apparatus 17 of the communication apparatus 7 is composed of a lighting apparatus 11 and a light-emitting body 14. A display apparatus 19 of the communication apparatus 6 is composed of a lighting apparatus 13 and a light-emitting body 16. The lighting apparatuses 17 and 19 provide illuminated display when the ATM communication apparatuses 6 and 7, respectively, receive a lighting command (display command). A display apparatus 18 of the ATM transmission route 9 is composed of a lighting apparatus 12 and a light-emitting body 15. The lighting apparatus 15 provides illuminated display when the ATM transmission route 9 receives a lighting command (display command). In the example shown in FIG. 1, the communication apparatuses and ATM transmission routes other than the communication apparatuses 6 and 7 and the ATM transmission route 9 are not provided with a display capability.

A description will now be given of the operation performed in the construction of FIG. 1. The ATM terminal #1 or the ATM switch 4 supplies the ATM terminal #2 with a display command for causing the display apparatus provided in the ATM communication apparatus or the ATM transmission route to provide a display. The communication apparatuses 6, 7 and the ATM transmission route 9 receiving the display command cause the light-emitting bodies 14–16 to emit light. In this way, the display apparatus provided in the communication apparatuses 6, 7 and the ATM transmission routes 9 located on a transmission route between the ATM terminal #1 (or the ATM switch 4) and the ATM terminal #2 provide a display. Thus, the transmission route on which the display command is transmitted is visualized by illuminated display.

In the example of FIG. 1, the illuminated display readily reveals that ATM data is transmitted to the communication apparatuses 6, 7 and the ATM transmission route 9. When the light-emitting bodies 14 and 15 are not emitting light while the light-emitting body 16 is emitting light, it is revealed that a failure occurs between the communication apparatus 6 and the ATM transmission route 9. Accordingly, the status of failure is readily determined based on the status of illuminated display.

While an ATM switched network is assumed in the foregoing and following description, the invention is equally applicable to other networks. The foregoing and following description also assume that light-emitting bodies are used to construct a display apparatus, an oscillating apparatus, a sonic wave generating apparatus or an illumination color changing apparatus may be used as an alternative to a light-emitting body. An ATM transmission route may be constructed using a wireless circuit instead of a fiber-optic cable.

Figure 3:
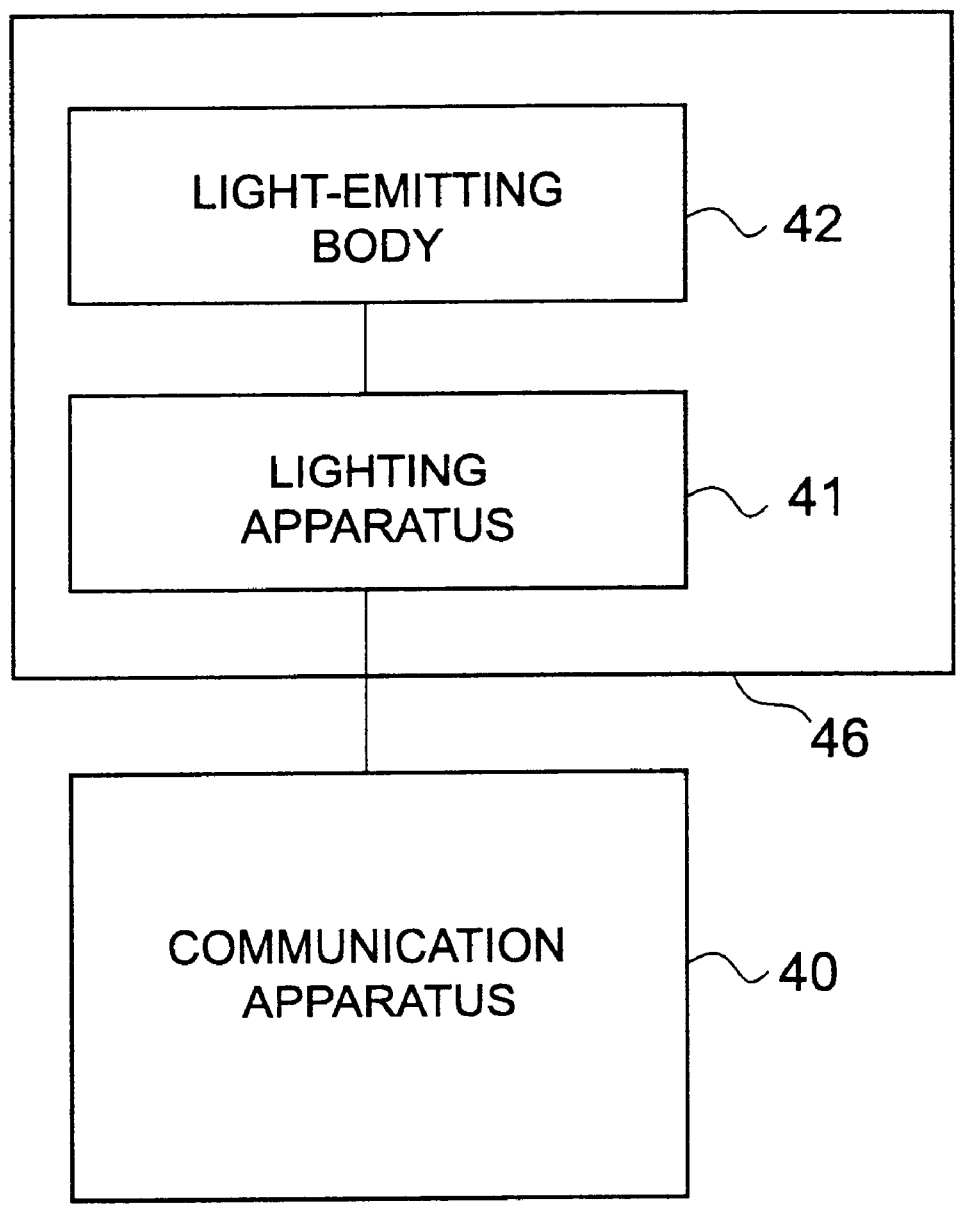
FIG. 3 shows a communication apparatus provided with a display apparatus.

In the present invention, it is assumed that the display capability of the communication apparatuses is implemented by a display apparatus. FIG. 3 shows such a communication apparatus. Referring to FIG. 3, a communication apparatus 40 is provided with a display apparatus 46. Communication apparatuses in the ATM switched network other than the communication apparatus 40 may not be provided with a display capability.

Figure 4:
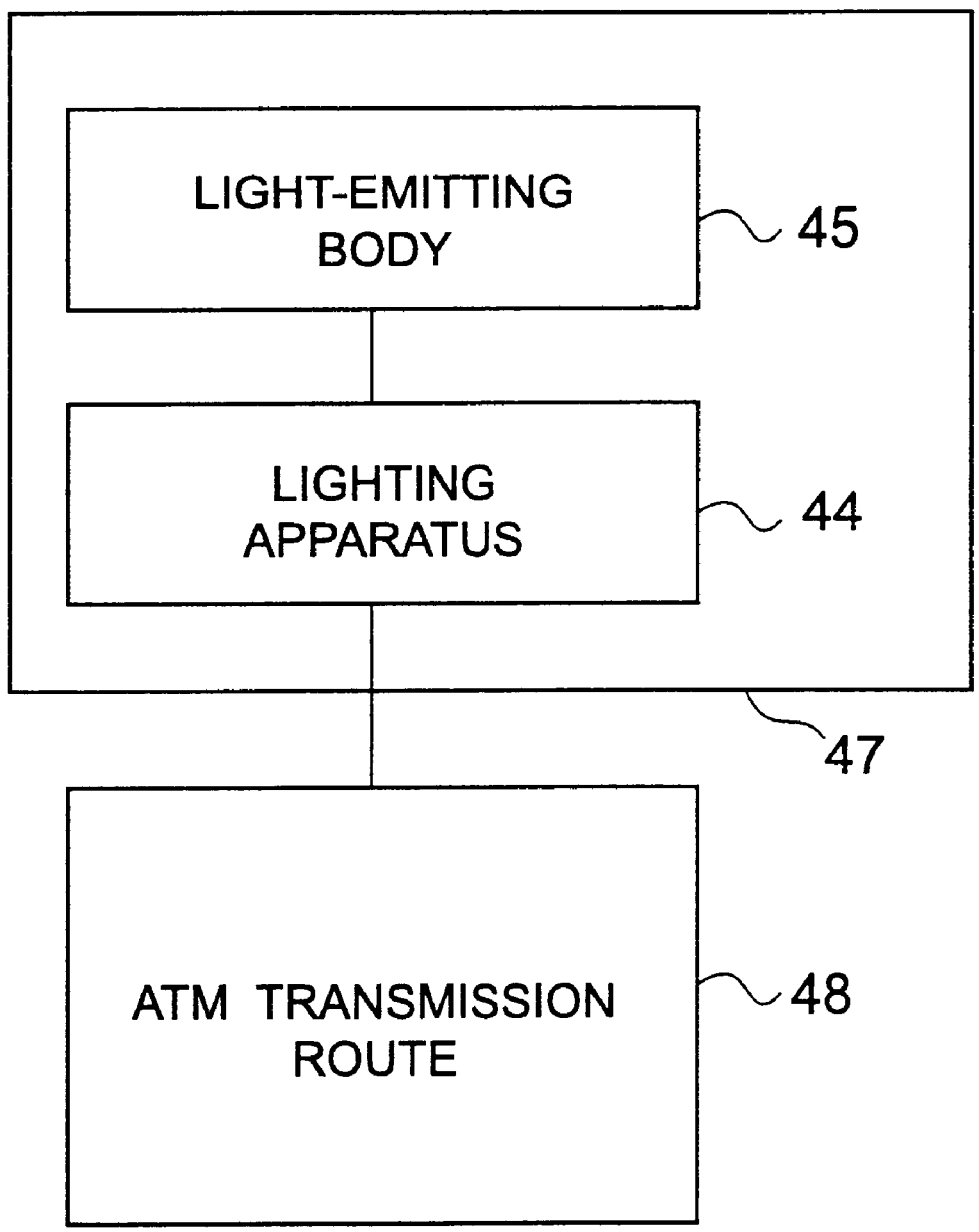
FIG. 4 shows an ATM transmission route provided with a display apparatus.

It is also assumed that the display capability of the ATM transmission routes is implemented by a display apparatus. FIG. 4 shows such a ATM transmission route. Referring to FIG. 4, a ATM transmission route 43 is provided with a display apparatus 47. ATM transmission routes in the ATM switched network other than the ATM transmission route 43 may not be provided with a display capability.

Figure 5:
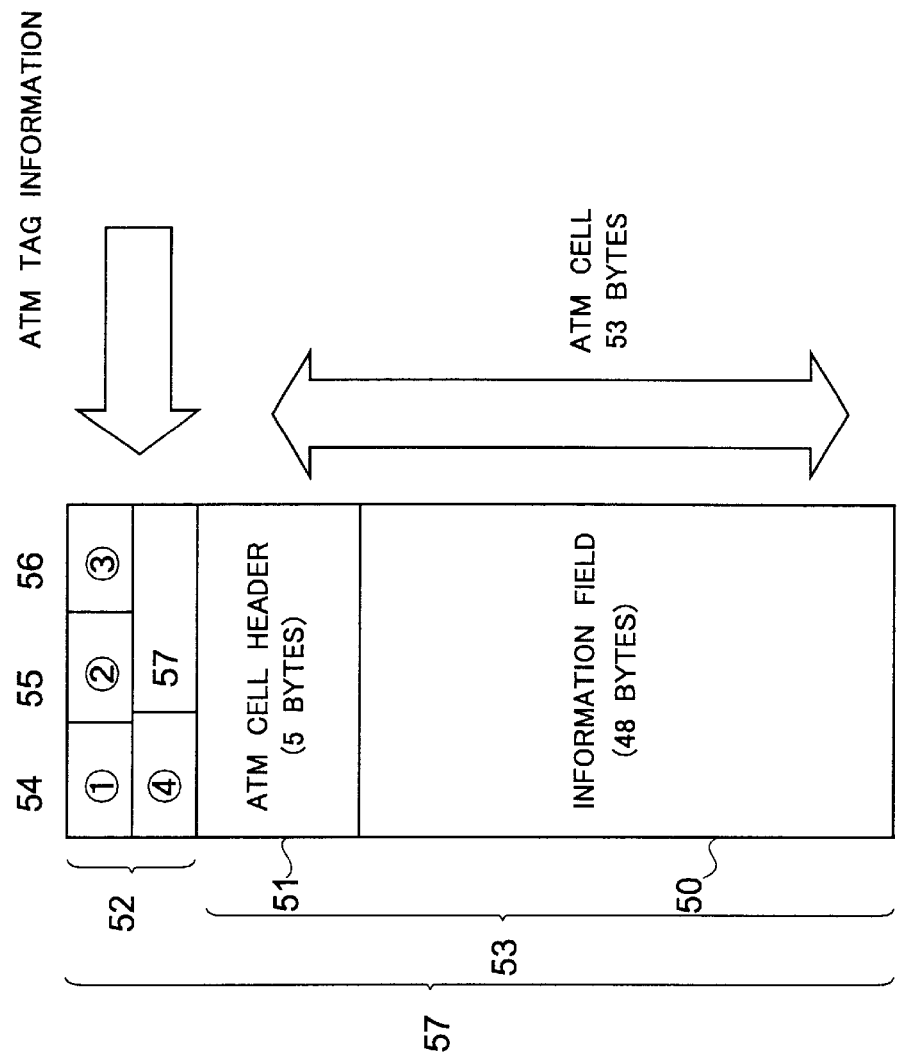
FIG. 5 shows a tagged ATM cell.
Figure 6:
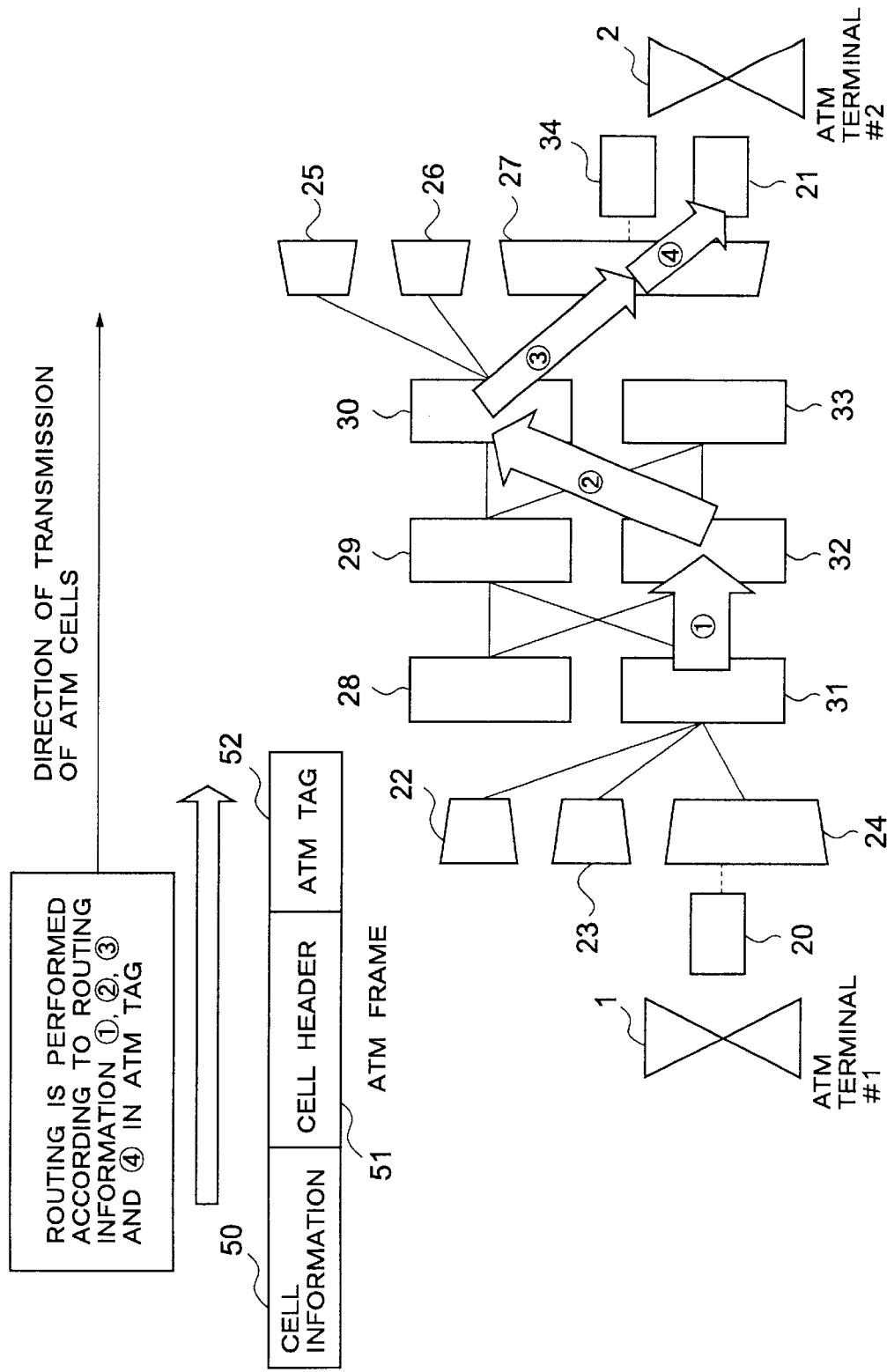
FIG. 6 shows ATM tag information and how a signal flows.
Figure 12:
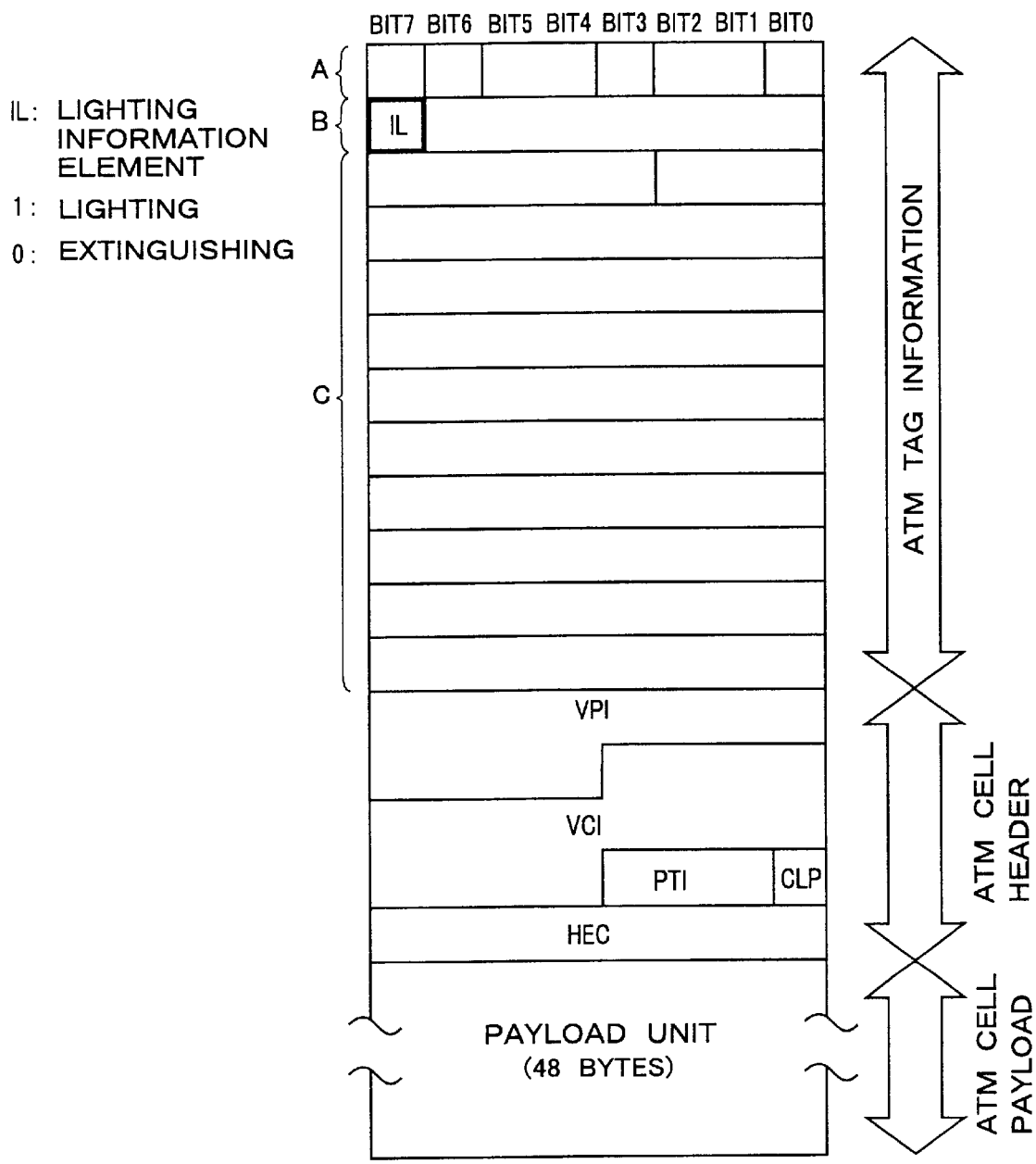
FIG. 12 shows a tagged ATM cell.

A description will now be given of tagged ATM cells transmitted in an ATM switched network and switching performed in the ATM switched network. FIG. 5 shows an example of a tagged ATM cell 57. The tagged ATM cell 57 is composed of an ATM cell 53 and an ATM tag 52. The ATM cell is composed of an information field 50 and an ATM cell header 51. The ATM tag 52 includes information (1), (2), (3) and (4) relating to routes in an ATM switch. The switch refers to the information (1), (2), (3) and (4) to perform switching. FIG. 6 illustrates how the switch performs switching. It is assumed that the ATM terminal #1 transmits the tagged ATM cell 57 of FIG. 5 to the ATM terminal #2. The subscriber circuit 20 transmits the tagged ATM cell 57 from the ATM terminal #1 to the multiplexing circuit 24 via a metallic transmission route. The multiplexing circuit 24 subjects a plurality of tagged ATM cells from the subscriber circuit 20 to multiplexing. The multiplexed tagged ATM cells are transmitted to the self routing module 31 via a fiber-optic cable. The self routing modules 31, 32 and 30, and the distributing circuit 27 refer to the information (1), (2), (3) and (4) contained in the tag of the multiplexed tagged ATM cell so as to route the multiplexed tagged ATM cell as indicated by (1), (2), (3) and (4) in FIG. 6. Thus, the multiplexed tagged ATM cells are transmitted to the subscriber circuit 21 of the ATM terminal #2. An actual tagged ATM cell has a frame construction as shown in FIG. 12. Routing information is written in a field indicated by C constituting ATM tag information.

As shown in FIG. 12, routing information is also written in a VPI (virtual path identifier) field and a VCI (virtual channel identifier) field in the ATM cell. When the tag information is absent, the VPI field and the VCI field are referred to for routing.

A description will now be given of a lighting command (display command) issued to the communication apparatus and the ATM transmission route. A lighting command is issued in the form of a tagged ATM cell or an ATM cell.

For example, in a case in which a tagged ATM cell is used to construct the lighting command, information indicating whether the light-emitting body is to be lighted is contained in an area indicated by IL (lighting information element) in a field B of the ATM tag information field. When an entry in the IL area is such that IL=1, the light-emitting body is to be lighted. When IL=0, the light-emitting body is not to be lighted. Upon receipt of the tagged ATM cell having the tag information where IL=1, the communication apparatus and the ATM transmission route having the display capability automatically provide an associated illuminated display. Accordingly, the communication apparatus and the ATM transmission route located on a transmission route defined by the routing information in the field C in the ATM tag information field are indicated by illuminated display. Thus, the entire transmission route is displayed by illumination. The field indicated by A in the ATM tag information field stores information relating to management of resources inside the network.

Figure 13:
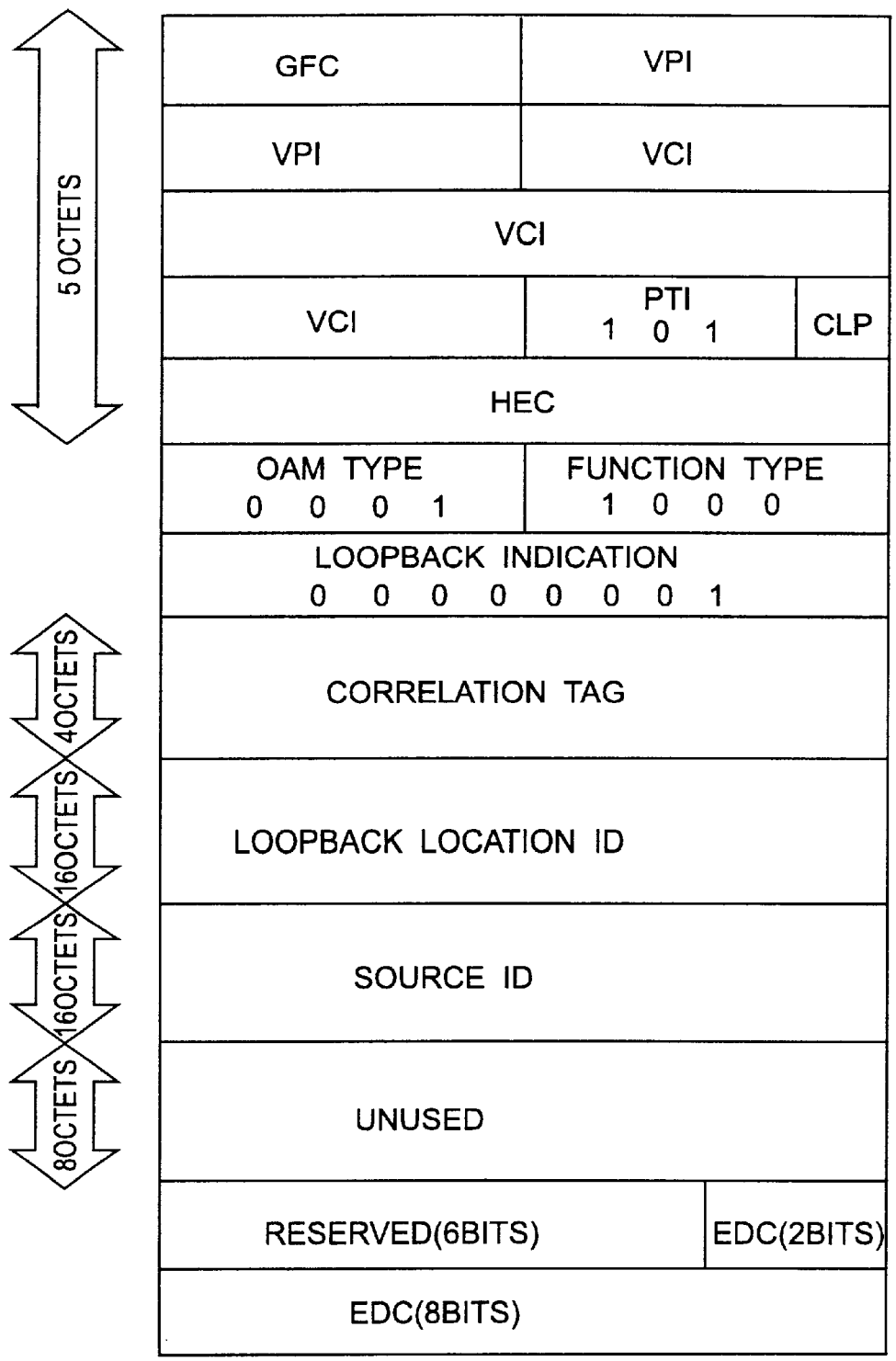
FIG. 13 shows an OAM loopback cell.

When an ATM cell is used to construct the display command, an OAM (operation, administration and maintenance) cell is used, for example. An OAM cell is a special ATM cell used for operation, administration and maintenance of the network. A selected OAM cell that can be exchanged between users is used as a lighting command. For example, FIG. 13 shows a loopback cell. A loopback cell is defined such that an entry in a OAM type field is 001, an entry in a function type field is 1000, and an entry in a PTI (payload type identifier) field is 101. The location of loopback is defined by an entry in a loopback location field. When such entries are provided, this ATM cell itself constitutes a lightning command. The communication apparatus and the transmission route monitor the OAM Type field, the function type field and the PTI field. When entries in these fields are as described above, it is determined that the communication apparatus and the transmission route have received a lightning command so that illuminated display is performed automatically. As a result, a loop transmission route is indicated by illuminated display.

Figure 14:
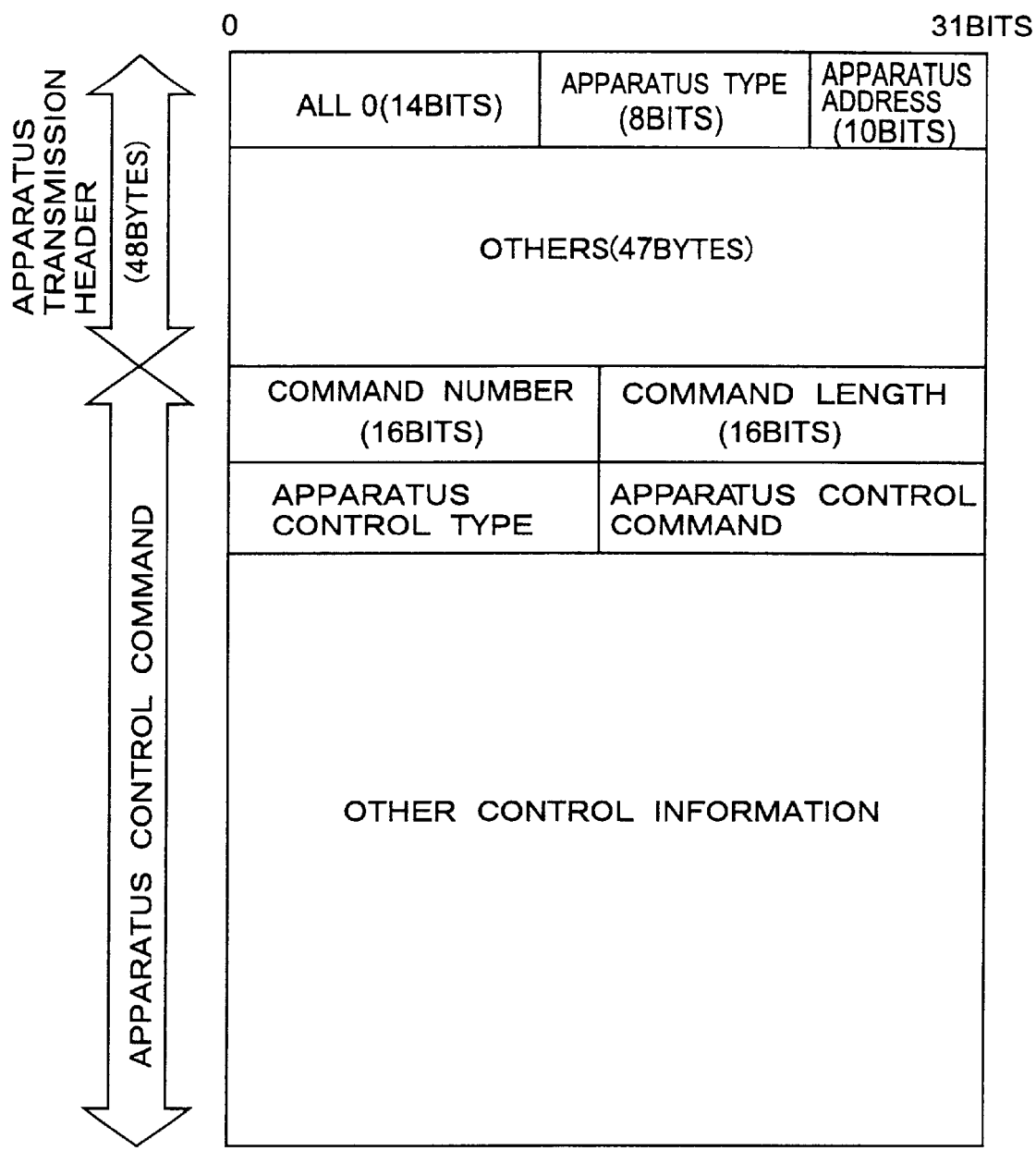
FIG. 14 shows a communication apparatus control command transmitted over the ATM Layer 3.
Figure 15:
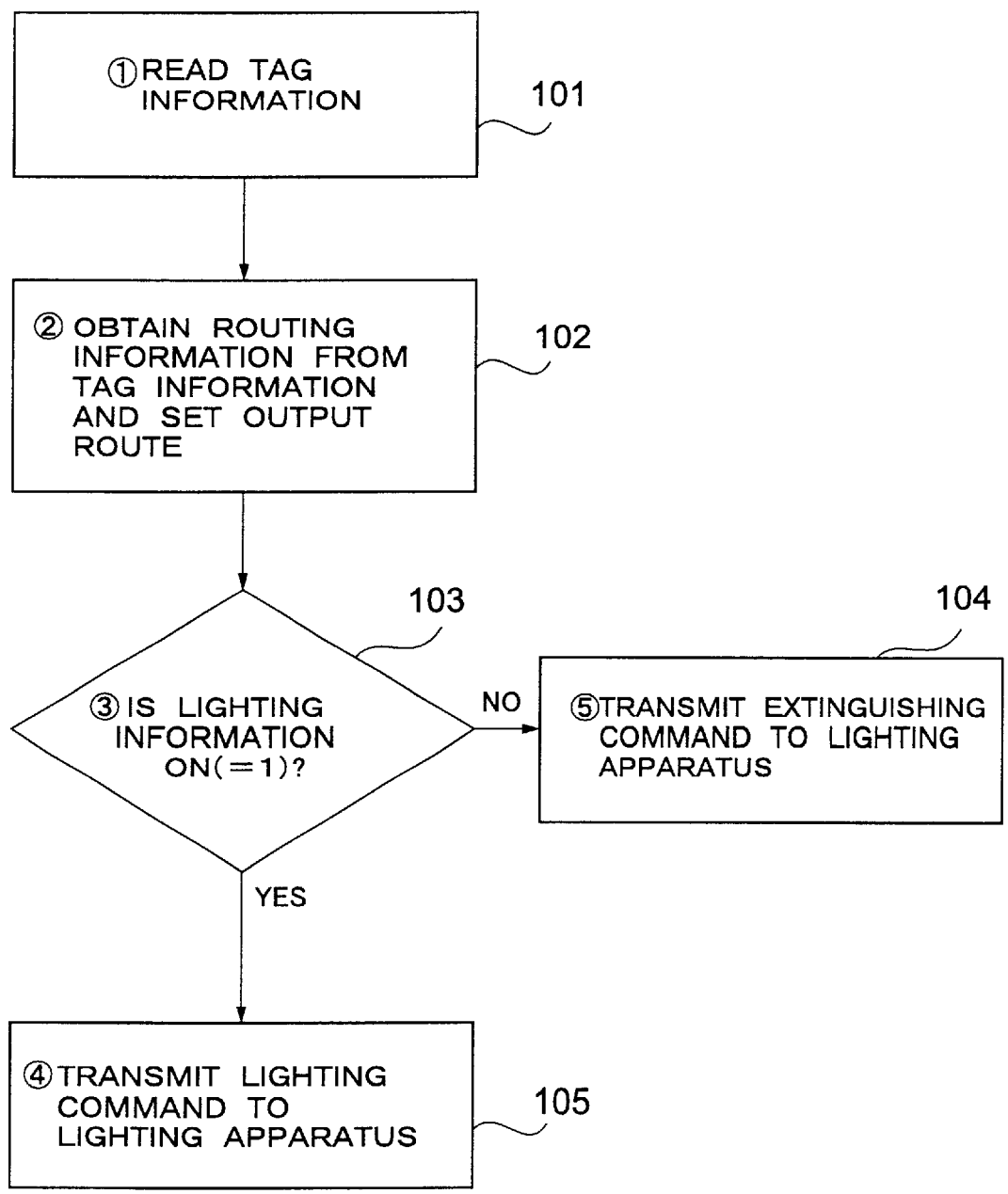
FIG. 15 shows an algorithm for determining whether a lighting command or a extinguishing command is to be issued.

Another type of ATM cell used to convey a lighting command is illustrated in FIG. 14. FIG. 14 shows a format of a communication control command delivered on the ATM Layer 3. The ATM Layer 3 is a communication control layer. An ATM cell used in this layer is composed of 53 bytes. For example, referring to FIG. 14, an address of a destination is set in an apparatus address field and an entry 4000H defining that the ATM cell is a lighting command is provided in an apparatus control command field. When a communication terminal or a switch transmits the communication control cell according to the format of FIG. 14, the communication apparatuses and transmission routes located on a transmission route leading to the destination monitor the apparatus control command field. When the communication apparatus and the transmission route receive the ATM cell having 4000H entered in the apparatus control command field, the communication apparatus and the transmission route cause an associated display apparatus to give a display.

A control command transmitted on the ATM Layer 5 includes more than 600 bytes. Like ATM cells on the ATM Layer 3, the control command on the ATM Layer 5 is divided into units of 53 bytes for transmission. Accordingly, the ATM cell on the ATM Layer 5 may be used to convey a lighting command by entering 4000H in the apparatus control command field in the divided ATM cell.

Figure 7:
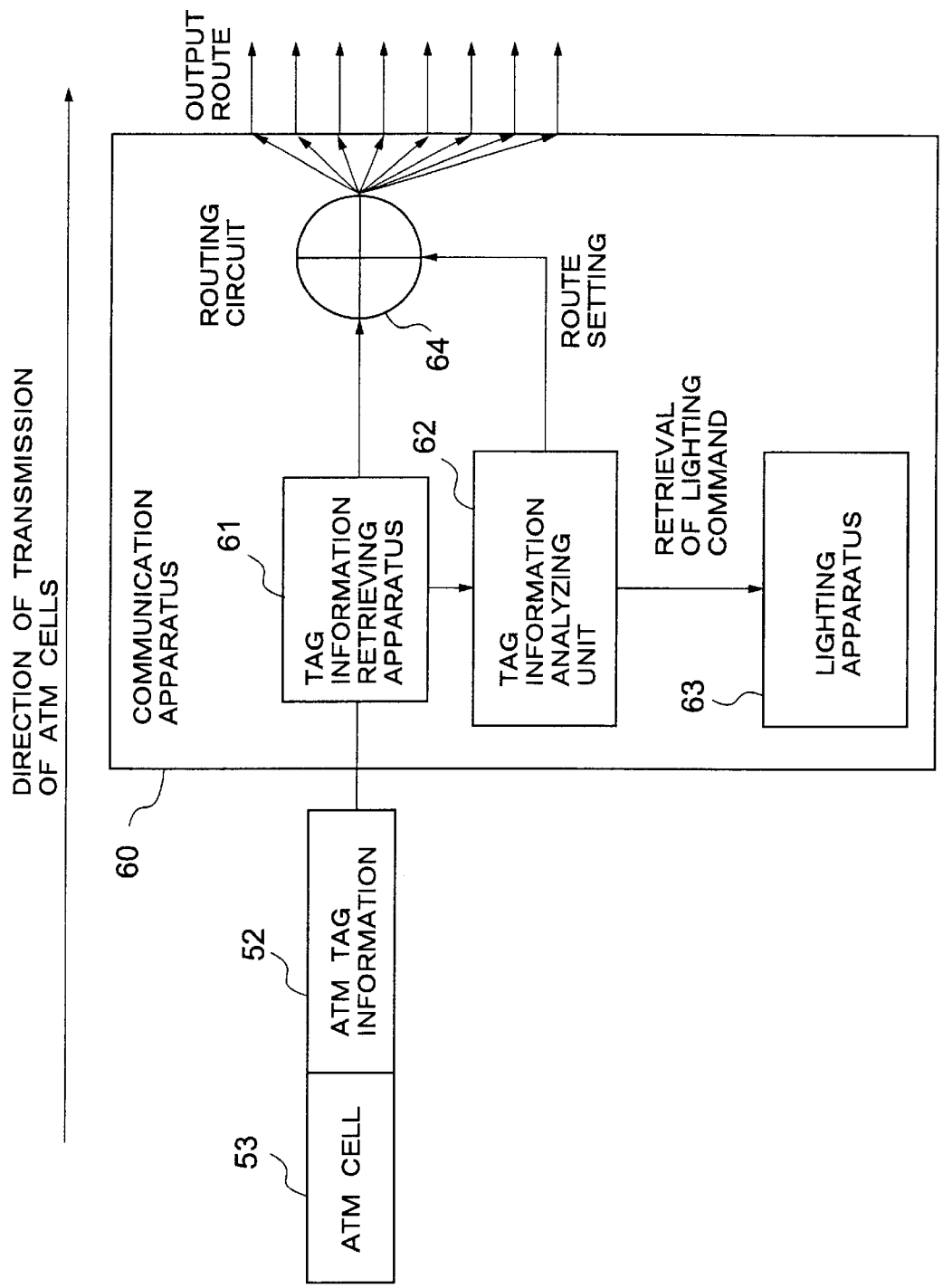
FIG. 7 shows how a lighting command is retrieved in a communication apparatus.

A description will now be given of a case where a lighting command is retrieved by referring to ATM tag information contained in a tagged ATM cell. FIG. 7 shows how a lighting command is retrieved in a communication apparatus. A communication apparatus 60 with routing capabilities includes a tag information retrieving apparatus 61, a tag information analyzing unit 62, a lighting apparatus 63 and a routing circuit 64. The tag information retrieving apparatus 61 retrieves the ATM tag information contained in a received tagged ATM cell and delivers the ATM information to the tag information analyzing unit 62. The tag information analyzing unit 62 sets a route based on routing information constituting the tag information so as to select an exit route for the routing circuit 64. Simultaneously, the tag information analyzing unit 62 examines the lighting information element (IL) area (FIG. 12) so as to determine whether or not the received tagged ATM cell embodies a lighting command. If it is found that the tagged ATM cell embodies a lighting command, the lighting apparatus 53 is operated to provide an illuminated display.

Figure 8:
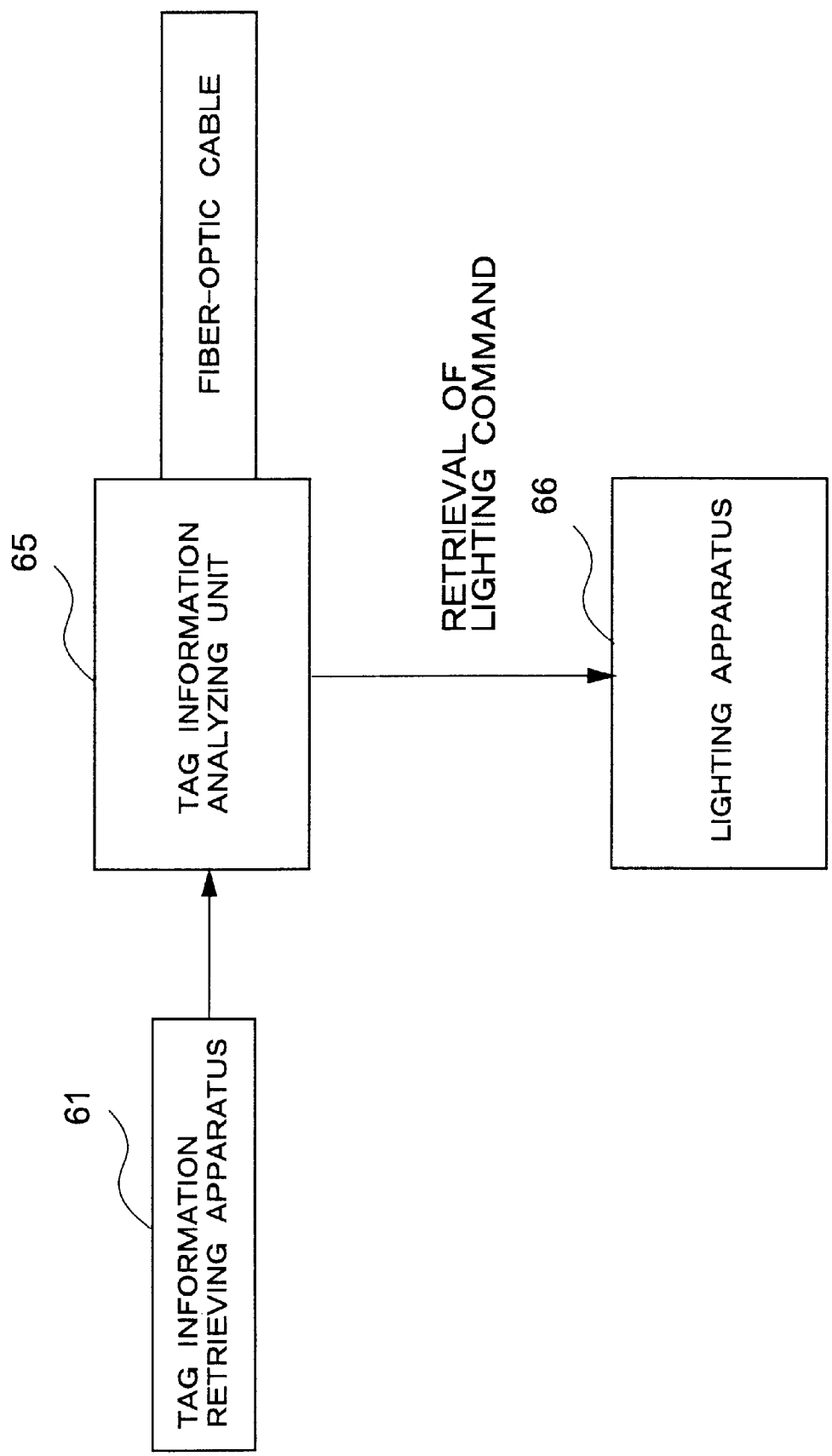
FIG. 8 shows how a lighting command is retrieved in a fiber-optic cable (ATM transmission route)

FIG. 8 shows how a lighting command is retrieved in a fiber-optic cable (ATM transmission route). A tag information analyzing unit 65 is provided in a terminal of a fiber-optic cable. Upon receipt of an output of the tag information retrieving apparatus 61 of the communication apparatus connected to the fiber-optic cable, the tag information analyzing unit 65 examines the lighting information element (IL) area (FIG. 12) so as to determine whether or not the received tagged ATM cell embodies a lighting command. If it is found that the tagged ATM cell embodies a lighting command, the tag information analyzing unit 65 outputs a lighting command to a lighting apparatus 66 so as to provide an illuminated display.

Figure 9:
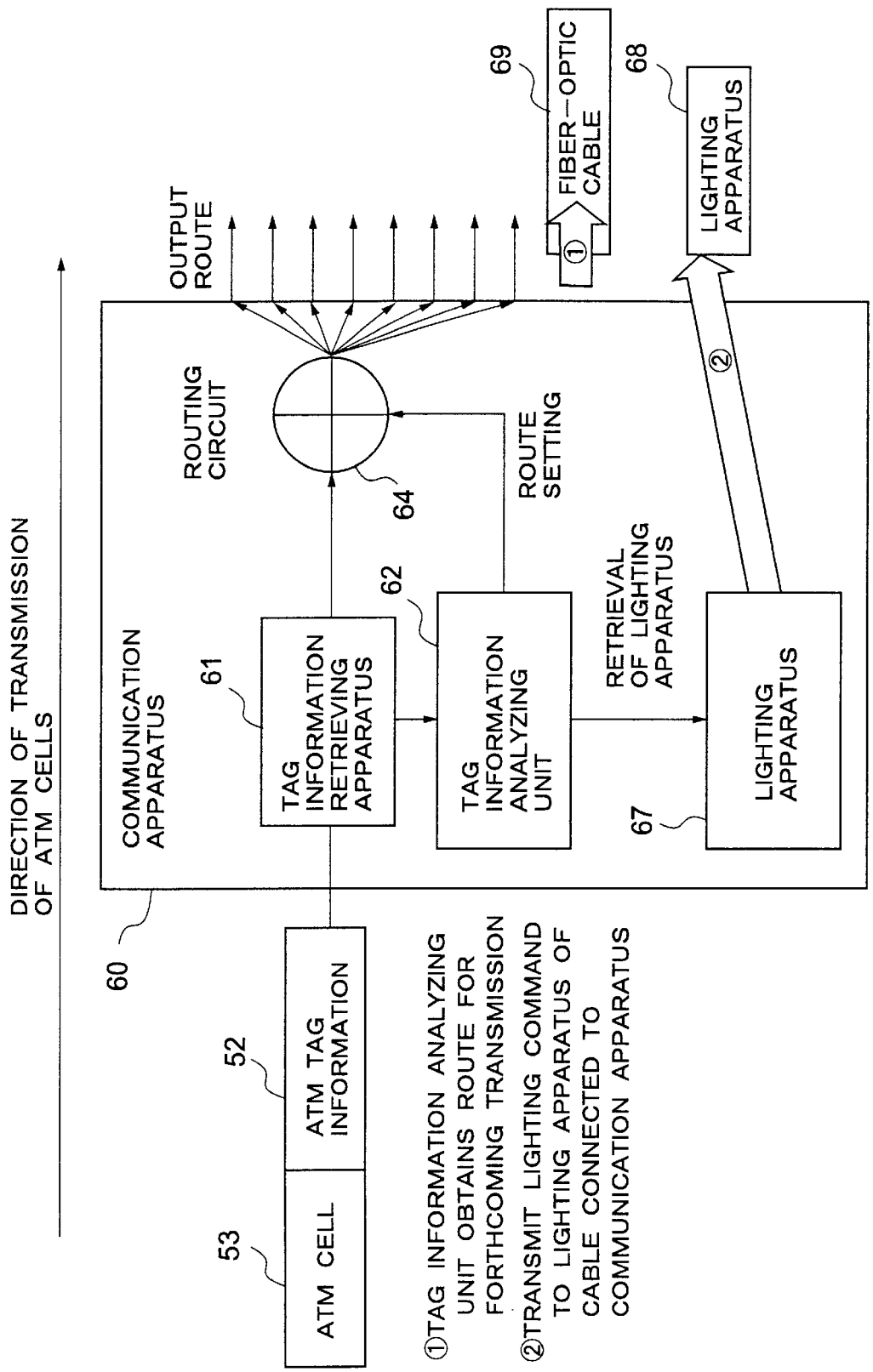
FIG. 9 shows a case where a tag information analyzing unit of a fiber-optic cable of FIG. 8 is omitted.

FIG. 9 shows a case where the tag information analyzing unit of a fiber-optic cable of FIG. 8 is omitted. The communication apparatus 60 with routing capabilities includes the tag information retrieving apparatus 61, the tag information analyzing unit 62, a lighting apparatus 67 and the routing circuit 64. As in the construction of FIG. 7, the tag information retrieving apparatus 61 retrieves the ATM tag information from the received tagged ATM cell and delivers the ATM tag information to the tag information analyzing unit 62. The tag information analyzing unit 62 sets a route based on routing information constituting the tag information so as to select an exit route for the routing circuit 64. Simultaneously, the tag information analyzing unit 62 examines the lighting information element (IL) area (FIG. 12) so as to determine whether or not the received tagged ATM cell embodies a lighting command. If it is found that the tagged ATM cell embodies a lighting command, the tag information analyzing unit 62 outputs a lighting command to a lighting apparatus 67 so as to provide an illuminated display. The tag information analyzing unit 62 also determines a fiber-optic cable for an exit route based on the route information so as to cause a lighting apparatus 68 of the fiber-optic cable of the exit route to provide an illuminated display. With this, it is not necessary for a fiber-optic cable to have a tag information analyzing apparatus. Accordingly, the cost of the ATM network is reduced.

In the description with reference to FIGS. 7–9, the tag information retrieving apparatus, the tag information analyzing unit and the lighting apparatus are described as being separate entities. However, one or two apparatuses may include the facilities of these three components. Alternatively, at least one of these three facilities may be included in another apparatus.

In FIGS. 7–9, it is assumed that the tagged ATM cell as shown in FIG. 12 is used. However, the constructions of FIGS. 7–9 are equally applicable to a case where ATM cells as shown in FIG. 13 or FIG. 14 are used. The only requirement is that a cell information retrieving apparatus, a cell information analyzing unit instead of a tag information retrieving apparatus and a tag information analyzing unit should be provided in communication apparatuses and transmission routes.

Figure 10:
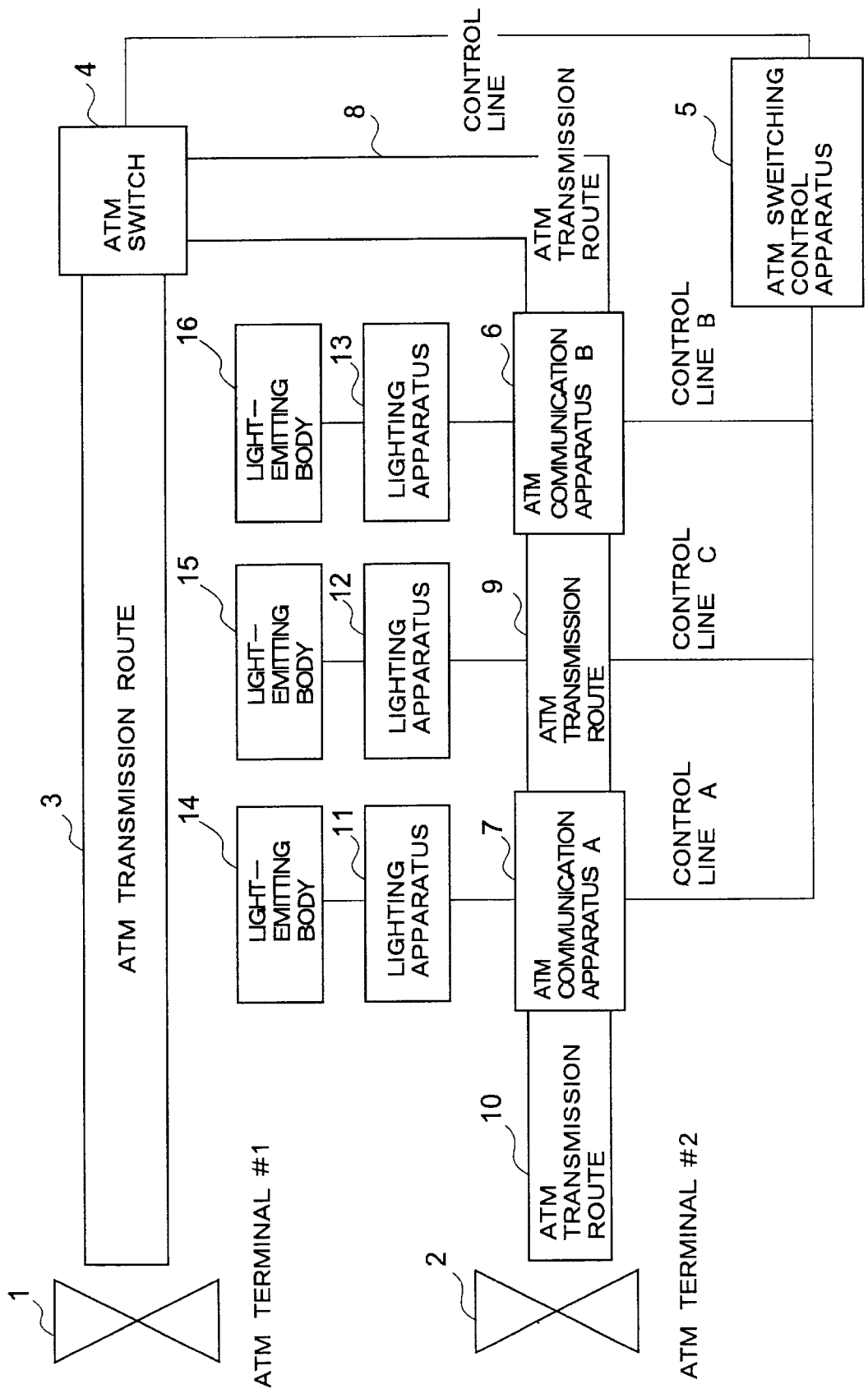
FIG. 10 shows a construction wherein a lighting command is transmitted over a separate line.

In the above descriptions, it is assumed that a tagged ATM cell or an ATM cell is transmitted through an ATM switched network so that the communication apparatus and the transmission route involved in transmission are indicated by illuminated display. A description will now be given of a case where the communication apparatus and the transmission route involved in transmission are indicated by illuminated display without transmitting a tagged ATM cell or an ATM cell in the ATM switched network. As shown in FIG. 10, in many cases, communication apparatuses in an ATM switched network are controlled by a line (control line) exclusively used for control of the communication apparatuses. Referring to FIG. 10, an ATM switch control apparatus 5 may predict a transmission route so as to cause a display apparatus provided in the communication apparatus and the ATM transmission route located on a transmission route to provide illuminated display. More specifically, the ATM switch control apparatus 5 instructs the ATM communication apparatus 6 and the ATM communication apparatus 7 to light the light-emitting body 15 and the light-emitting body 14, respectively, via a control line B and a control line A, respectively. The ATM communication apparatus 6 and the ATM communication apparatus 7 light the light-emitting body 16 and the light-emitting body 14, respectively, using the lighting apparatus 13 and the lighting apparatus 11, respectively. The ATM switch control apparatus 5 outputs a lighting command to the lighting apparatus 12 of the ATM transmission route 9 via a control line C so as to light the light-emitting body 15. By thus indicating a transmission route for forthcoming transmission by illuminated display, an error in connection is revealed in the form of a failure of lighting in communication apparatuses and transmission routes located on a target route and an erroneous lighting in communication apparatuses and transmission routes in unrelated locations.

Figure 11:
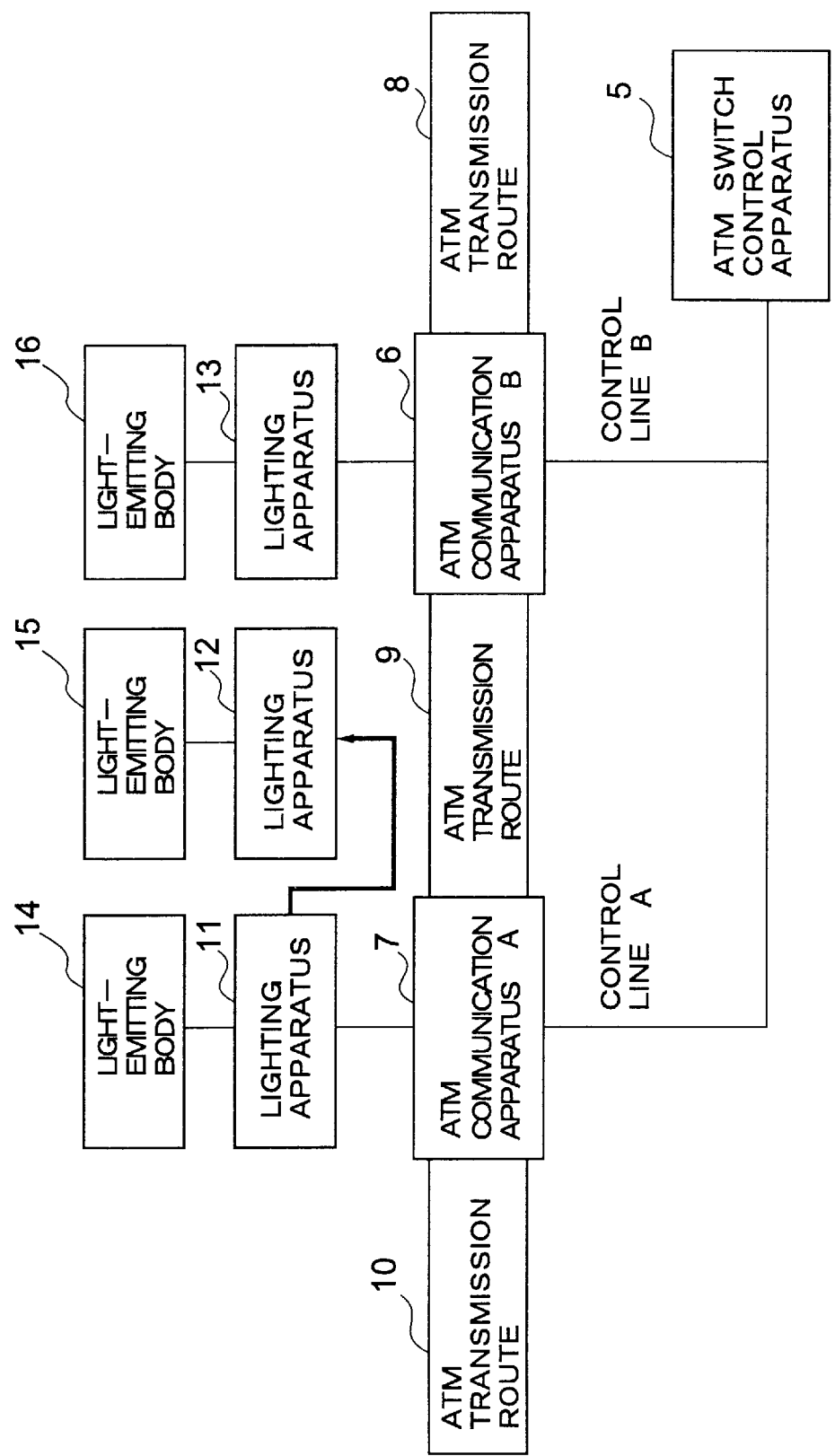
FIG. 11 shows how a lighting apparatus of an ATM transmission route is operated in response to an output from a lighting apparatus under the control of an ATM communication apparatus connected to the target ATM transmission route.

Providing a control line for each transmission route requires a relatively high cost. As shown in FIG. 11, the lighting apparatus 12 of an ATM transmission route may be operated in response to an output from the lighting apparatus 11 under the control of the ATM communication apparatus 7 connected to the ATM transmission route.

A description will now be given of an algorithm used to determine whether a lighting command or an extinguishing command is to be issued.

In step 101, tag information attached to a tagged ATM cell is read. In step 102, an output route information is obtained from routing bit information in the tag information read in step 101 so as to select an exit route for the routing circuit. In step 103, a lighting information element area in the tag information read in step 101 is examined. If the lighting information element is ON (=1), a lighting command is transmitted to a lighting apparatus in step 105. If the lighting information element is OFF (=0), an extinguishing command is transmitted to the lighting apparatus in step 104. A transmission route may be indicated by extinguishing the lighting. In the present invention, extinguishing is thought of as an alternative form of lighting.

According to the embodiments described above, a transmission route is easily and efficiently identified by indicating by illuminated display communication apparatuses and transmission routes located on a target transmission route in an ATM switched network. With this, the location of a failure in the ATM switched network is easily and efficiently identified. Generally, a transmission route in an ATM switched network is embodied by a fiber-optic cable. However, the present invention is applicable to a network other than an ATM switched network. That is, the present invention may be applied to a network formed by a wireless transmission circuit or a metallic circuit.

Communication apparatuses referred to in the foregoing description may include ATM switches operated on the multi stage self routing module system, self routing modules, subscriber circuits, communication terminals, branching and inserting circuits, multiplexing and distributing apparatuses, add drop multiplexers (ADM) and cross connectors.

A description will now be given of a typical communication apparatus to which the present invention is applied.

Figure 16:
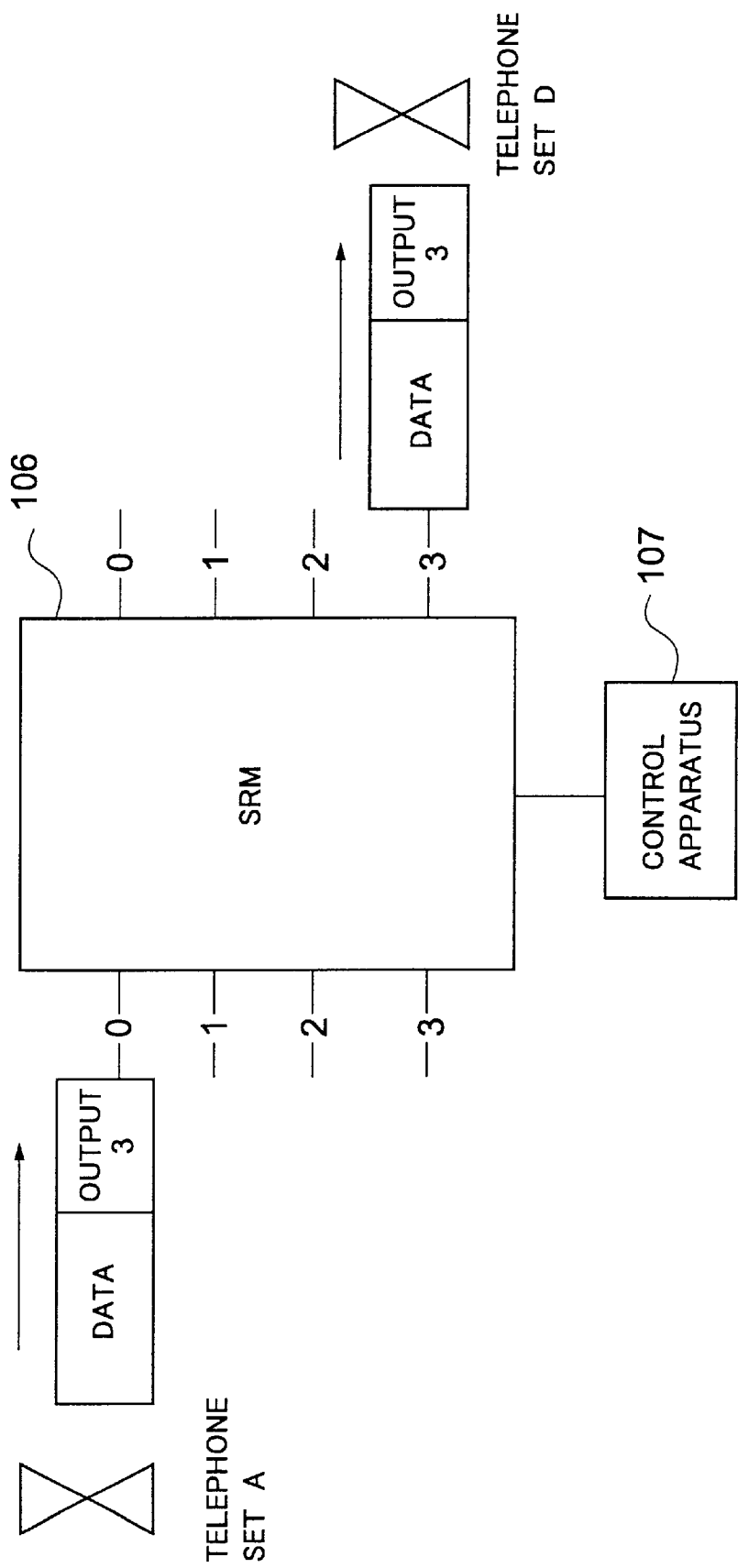
FIG. 16 shows a self routing module.

A self routing module (SRM) is a switching apparatus for reading a header of input data so as to identify a destination and select a destination of output. FIG. 16 is a schematic diagram showing an operation of a self routing module, wherein switching from a telephone set A to a telephone set D is performed. The telephone set A supplies an ATM cell having data in an information field 50 and a destination in the ATM header 51 to a "0" input terminal of a self routing module 106. The hardware of the self routing module 106 reads "destination 3" in the ATM header 51 and automatically outputs the ATM cell having the ATM header 51 to an output terminal "3".

Figure 17:
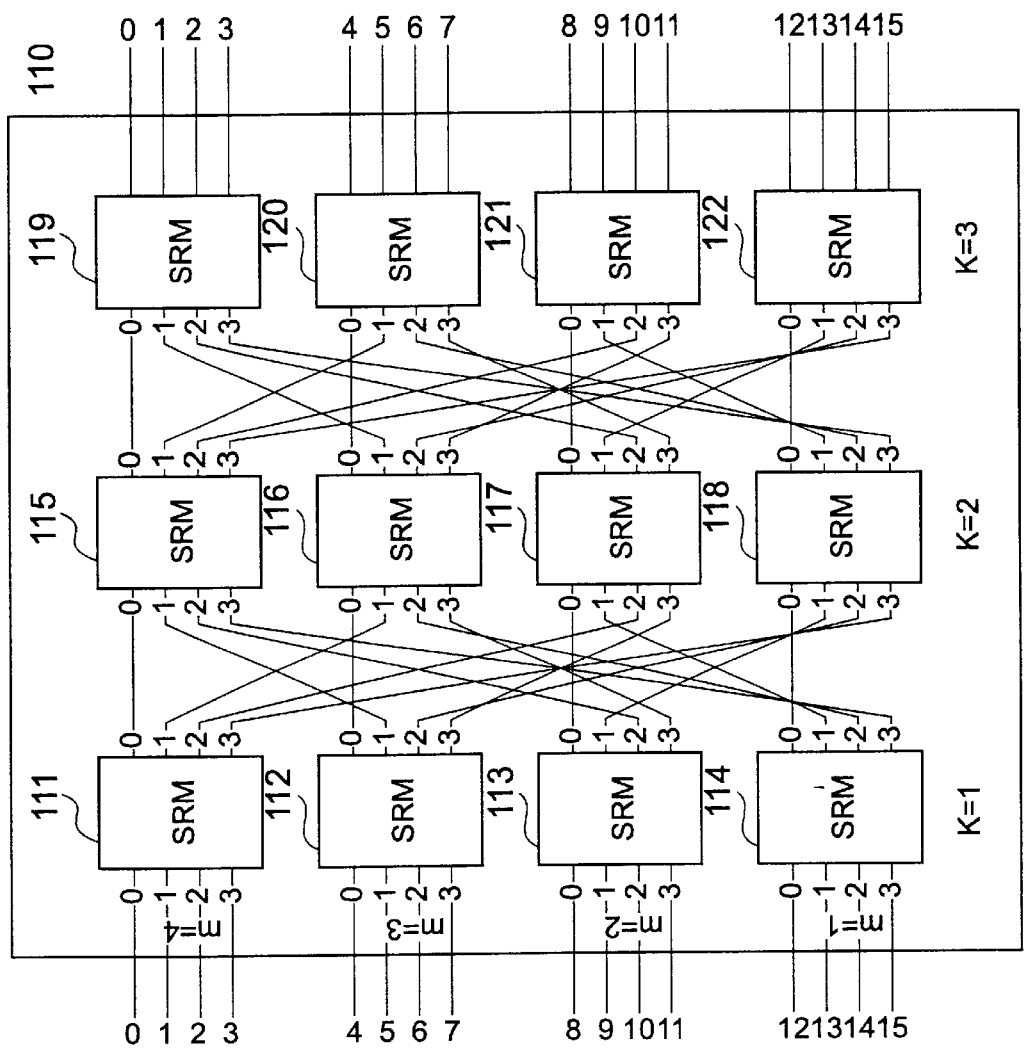
FIG. 17 shows an MSSR construction.

A large-capacity switch is constructed by assembling a plurality of such self routing modules. Such a construction is referred to as an MSSR construction. FIG. 17 shows an ATM switch according to the MSSR construction. The ATM switch illustrated in FIG. 17 is provided with four inputs and four outputs (m=4). Four self routing modules are arranged in a column and three self routing modules are arranged in a row. A 4*4 switching capability of a single self routing module is expanded to a 16*16 switching capability by introducing an MSSR construction. Thus, a large-capacity ATM switch is implemented.

Figure 18:
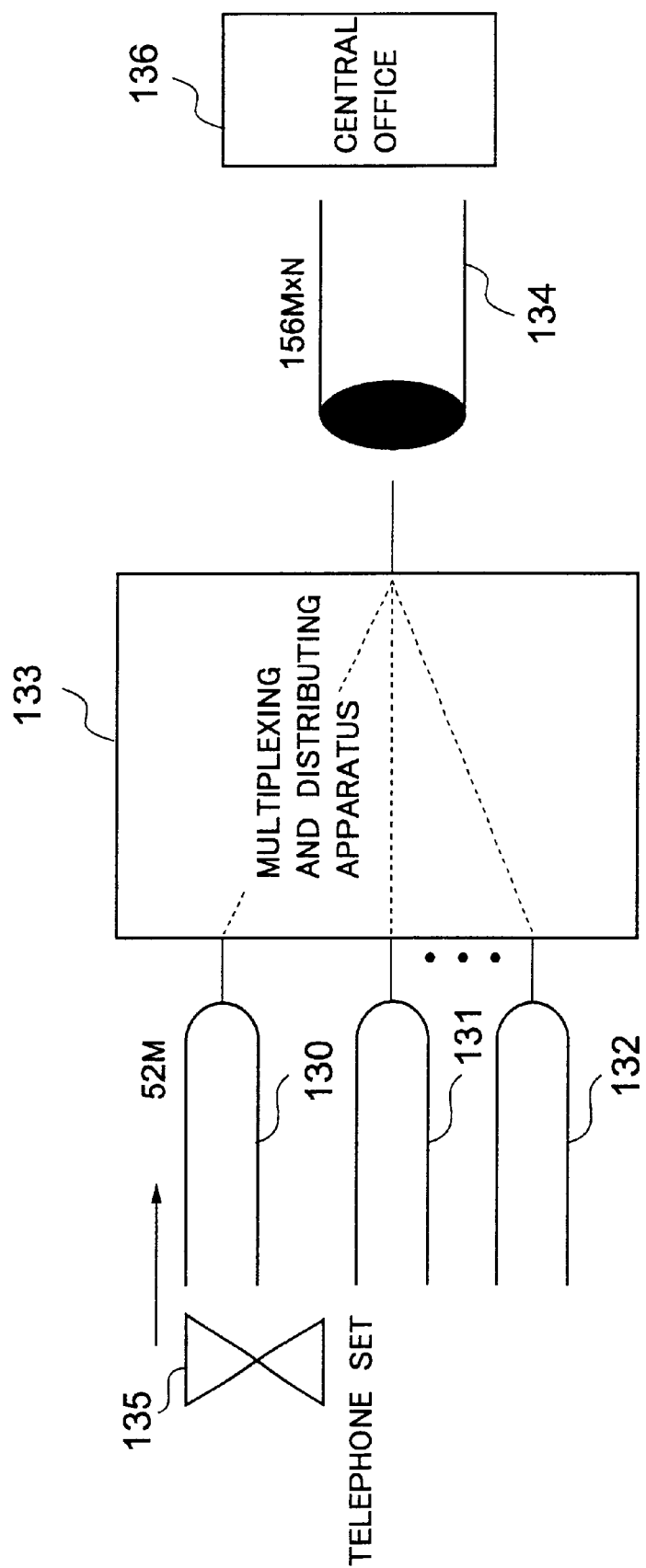
FIG. 18 shows a multiplexing and distributing apparatus.

It is to be noted that the telephone terminals are not exhaustively connected to the central office. Instead, a plurality of telephone lines are transformed into a multiplexed line so that the number of cables is reduced. Such reduction is enabled by a multiplexing and distributing apparatus. A multiplexing and distributing apparatus provides different functions that depend on the direction of communication. When the telephone terminal transmits to an exchange, the multiplexing function whereby signals from a plurality of telephone terminals are accommodated in a single line is utilized. When the exchange transmits to the telephone terminal, the distributing function whereby a multiplexed signal is distributed to telephone terminals is utilized. FIG. 18 is a schematic diagram showing a multiplexing and distributing apparatus. A signal from a telephone terminal 135 is transmitted to a multiplexing and distributing apparatus 133 using a 52-Mbps (megabits per second) line 130. The multiplexing and distributing apparatus 133 multiplexes 52-Mbps signals from a plurality of telephone terminals including the telephone terminal 135 transmitted over lines 130, 131 . . . , and 132, and transmits the multiplexed signal to an exchange 136 via a 156-Mbps line 134. A multiplexed signal from the exchange 136 is transmitted to the multiplexing and distributing apparatus 133 via the 156-Mbps line 134. The multiplexing and distributing apparatus 133 demultiplexes the multiplexed 156-Mbps signal and distributes the resultant signals to the respective terminals via the 52-Mbps lines 130, 131 . . . , 132.

Figure 19:
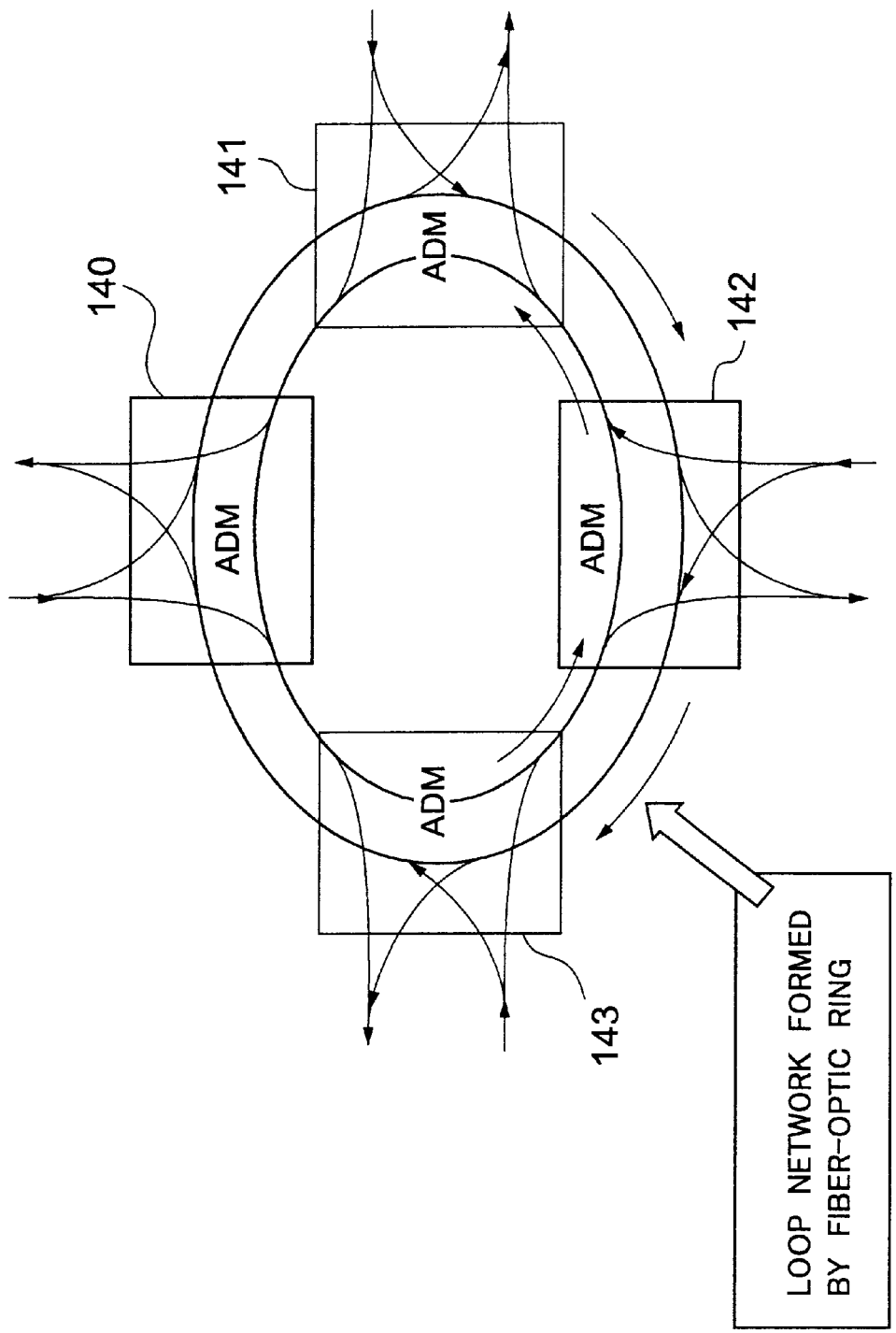
FIG. 19 shows an optical ring network using add drop multiplexers.
Figure 20:
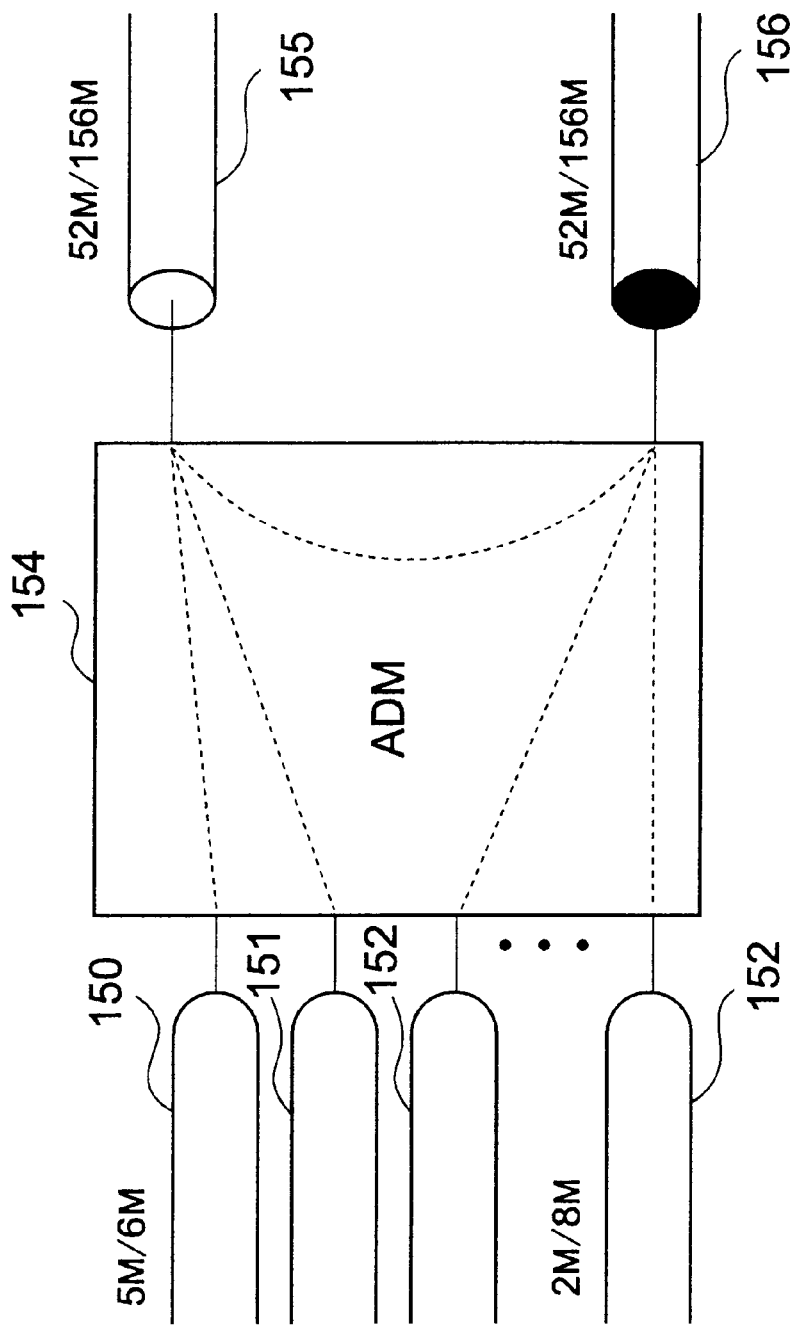
FIG. 20 shows an operation of an add drop multiplexer.

An add drop multiplexer (ADM) is similar to a multiplexing and distributing apparatus described above in that it provides the multiplexing and distributing functions between a high-speed circuit and a low-speed circuit. FIG. 19 shows a optical ring network using add drop multiplexers 140–143. As shown in FIG. 20, an add drop multiplexer performs multiplexing and distributing processes between a large-capacity circuit and a low-speed circuit constituting a loop.

Figure 21:
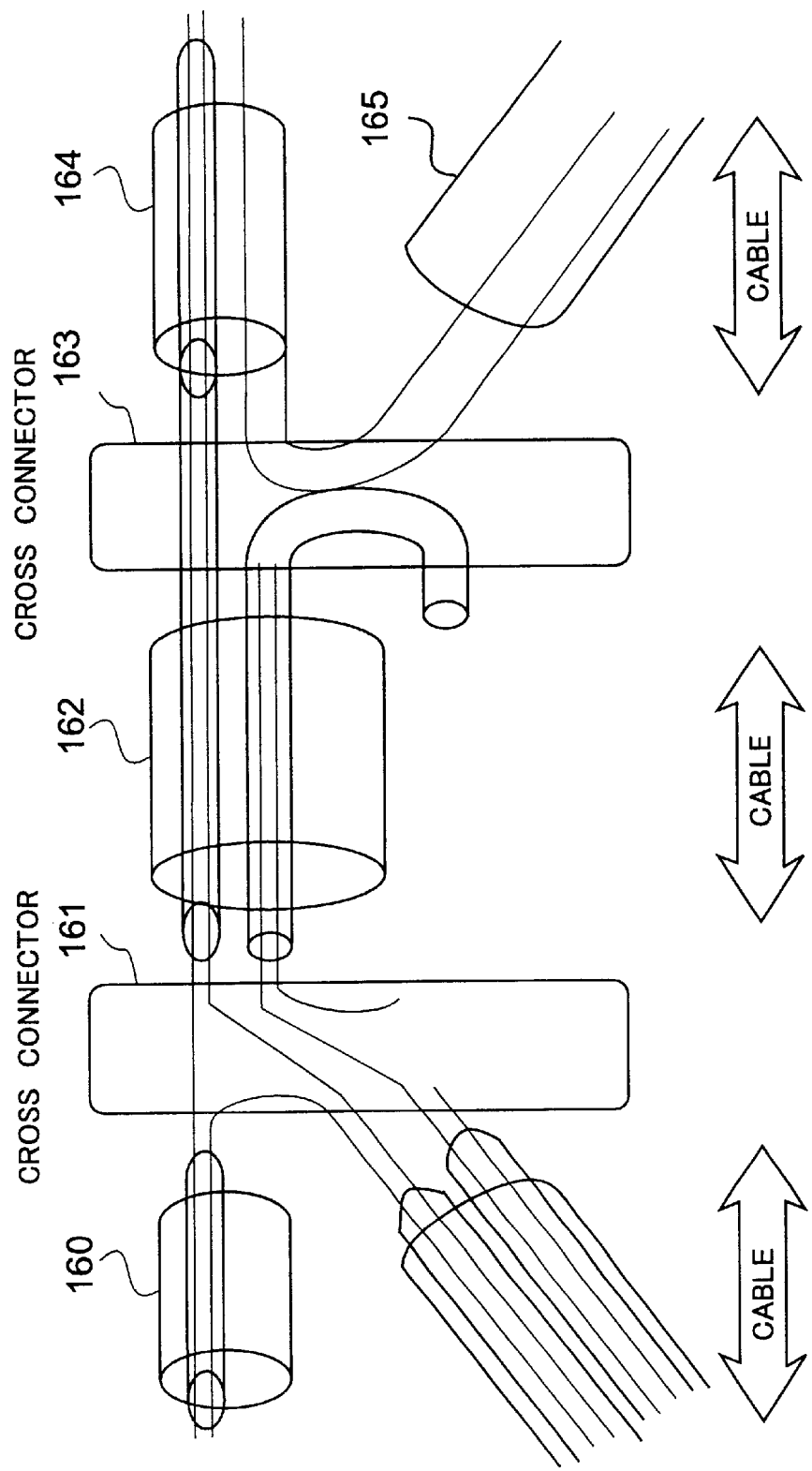
FIG. 21 shows a circuit using a cross connect apparatus.

A cross connect apparatus is used as a transmission apparatus and performs switching of transmission routes. More specifically, a cross connect apparatus is connected to a plurality of transmission routes so as to switch therebetween to select a communication channel. FIG. 21 shows a circuit using a cross connect apparatus.

According to the embodiments described above, the following merits are provided.

(1) The routes in which ATM cells are transmitted are successively indicated by illuminated display so that an operator is capable of identifying the routes.

(2) The route in which ATM cells are transmitted in a forthcoming transmission is identified without transmitting ATM cells.

(3) For identification of a bit error on an ATM transmission route, fiber-optic cables and communication apparatuses on a data transmission route are to be examined one by one. According to the invention, it is possible to easily identify the communication apparatuses and fiber-optic cables involved in the transmission.

(4) For identification of an error in the data that lists the arrangement of apparatuses accommodated in an ATM switched network and an error in the connection, connection of fiber-optic cables and arrangement of apparatuses are to be readily identified. The present invention provides such capabilities.

(5) In replacing ATM switches or cables, a proper location of installation and a proper connection can be identified before the actual replacing process.

(6) It is possible to confirm that a replacement of ATM switches or cables has been properly completed.

(7) The location of a failure in a switched network caused by man in the switched network (for example, caused by an error in the data that lists the arrangement of accommodated apparatuses or an error in connection) can be easily identified. Since the data communication route involved in the transmission is visualized, it is less likely that an error occurs in checking the connection and the arrangement of apparatuses.

(8) In a switched system in which apparatuses in a switched network are controlled by respective control lines exclusively provided for control of the apparatuses, a command for indicating the apparatus by illuminated display can be delivered without transmitting a cell. A connection error resulting from an error in wiring cables can be easily found.

(9) An operator can readily identify a status of connection between apparatuses and a state of routes between terminals. An error in checking routes can be prevented.

The present invention is not limited to the above described embodiments, and variations and modifications may be made without departing from the scope of the present invention.

What is claimed is:

1. A transmission route display method for use in a transmission system wherein a display apparatus that provides a display in a form of light-emission, oscillation, or sonic wave generation and change in the illumination color responsive to a display command is provided in at least one of communication apparatuses and transmission routes in a switched network, comprising the steps of:

one of said communication apparatuses in said switched network transmitting the display command to another one of said communication apparatuses or one of the transmission routes; and the display apparatus of said another one of said communication apparatuses or one of the transmission routes that received said display command providing a display so that a transmission route over which said display command is delivered is indicated by the display.

2. The transmission route display method as claimed in claim 1, wherein said switched network is an ATM switched network.

3. The transmission route display method as claimed in claim 2, wherein said ATM switched network includes an ATM switch composed of multiple stages each comprising self routing modules, at least one of said communication apparatuses is a self routing module, and at least one of said transmission routes is a transmission routes between self routing modules.

4. The transmission route display method as claimed in claim 3, wherein said display command is included in ATM tag information.

5. The transmission route display method as claimed in claim 2, wherein said display command is included in one of an ATM cell of the ATM Layer 3 and an ATM cell of the ATM Layer 5.

6. The transmission route display method as claimed in claim 2, wherein said display command is included in an operation, administration and maintenance cell.

7. The transmission route display method as claimed in claim 2 for use in the transmission system further comprising an ATM switch control apparatus for controlling said ATM switched network, wherein said ATM switch control apparatus causing, via lines separate from the transmission routes, the communication apparatus and the transmission route to provide the display using the respective display apparatuses.

8. The transmission route display method as claimed in claim 1, wherein said switched network includes a loop network.

9. The transmission route display method as claimed in claim 1, wherein said switched network is a local network composed of at least one communication apparatus and at least one transmission route.

10. The transmission route display method as claimed in claim 1, wherein at least one of said communication apparatuses is one of a switch, a self routing module, a subscriber circuit, a communication terminal, a branching and inserting circuit, a multiplexing and distributing apparatus, an add drop multiplexer and a cross connect apparatus.

11. The transmission route display method as claimed in claim 1, wherein the transmission route is one of a fiber-optic cable, a wireless circuit and a metallic circuit.

12. A transmission route display system comprising:

a switched network comprising communication apparatuses and transmission routes; and a display apparatus provided in at least one of said communication apparatuses and said transmission routes, wherein one of said communication apparatuses transmits a display command for causing the display apparatus of one of the communication apparatuses and the transmission routes to provide a display, in a form of light-emission, oscillation, or sonic wave generation and change in the illumination color an information analyzing unit is provided in at least one of said communication apparatuses and said transmission routes, and said information analyzing unit causes, responsive to the display command received from said one of said communication apparatuses, a display apparatus of another one of said communication apparatuses or one of the transmission routes to provide the display, so that a transmission route over which said display command is delivered is indicated by the display.

13. A transmission route display apparatus provided in at least one of communication apparatuses and transmission routes in a switched network, wherein an information analyzing apparatus is provided in at least one of said communication apparatuses and said transmission routes, and said information analyzing apparatus causes, responsive to a display command received from one of said communication apparatuses, the display apparatus of another one of said communication apparatuses or one of the transmission routes to provide a display, in a form of light-emission, oscillation, or sonic wave generation and change in the illumination color so that a transmission route over which said display command is delivered is indicated by the display.

14. The transmission route display apparatus as claimed in claim 13, wherein at least one of said transmission routes is not provided with the information analyzing unit, and wherein a display apparatus of a transmission route not provided with the information analyzing unit is operated by an output from the information analyzing unit of a communication apparatus connected to the transmission route not provided with the information analyzing unit.

15. The transmission route display apparatus as claimed in claim 13, wherein said switched network is an ATM switched network comprising an ATM switch control apparatus, and a display apparatus of a communication apparatus and a transmission route used in a forthcoming transmission is operated by an output from said ATM switch control apparatus delivered over a line separate from a data transmission route.

16. The transmission route display apparatus as claimed in claim 15, wherein the display command issued by said ATM switch control apparatus to the communication apparatus causes the display apparatus of the communication apparatus and the transmission route to provide the display.

17. The transmission route display apparatus as claimed in claim 13, wherein said information analyzing unit is embodied by one of a tag information analyzing unit and a cell information analyzing unit for analyzing ATM tag information and ATM cell information, respectively.

18. The transmission route display apparatus as claimed in claim 13, wherein at least one of said communication apparatuses is embodied by a switch, a self routing module, a subscriber circuit, a communication terminal, a branching and inserting circuit, a multiplexing and distributing apparatus, an add drop multiplexer and a cross connect apparatus.

19. The transmission route display apparatus as claimed in claim 13, embodied by one of a light-emitting apparatus, an oscillating apparatus, a sonic wave generating apparatus and an illumination color changing apparatus.

20. The transmission route display apparatus as claimed in claim 13, wherein said transmission routes are embodied by one of fiber-optic cables, wireless circuits and metallic circuits.

* * * * *